(12) United States Patent
Grinnell et al.

(10) Patent No.: US 8,915,692 B2
(45) Date of Patent: Dec. 23, 2014

(54) ADAPTABLE CONTAINER HANDLING SYSTEM

(75) Inventors: Charles M. Grinnell, Groton, MA (US); Joseph L. Jones, Acton, MA (US); Paul E. Sandin, Brookline, NH (US); Clara Vu, Cambridge, MA (US)

(73) Assignee: Harvest Automation, Inc., Billerica, MA (US)

( * ) Notice: Subject to any disclaimer, the term of this patent is extended or adjusted under 35 U.S.C. 154(b) by 1542 days.

(21) Appl. No.: 12/378,612

(22) Filed: Feb. 18, 2009

(65) Prior Publication Data

US 2009/0214324 A1 Aug. 27, 2009

Related U.S. Application Data

(60) Provisional application No. 61/066,768, filed on Feb. 21, 2008.

(51) Int. Cl.

| *B60P 1/22* | (2006.01) |
|---|---|
| *B65G 1/04* | (2006.01) |
| *A01G 9/14* | (2006.01) |
| *A01G 9/08* | (2006.01) |
| *B66F 9/06* | (2006.01) |
| *B60L 11/18* | (2006.01) |
| *B60L 15/38* | (2006.01) |

(52) U.S. Cl.
CPC . *B66F 9/063* (2013.01); *B65G 1/04* (2013.01); *B60L 2200/44* (2013.01); *A01G 9/143* (2013.01); *A01G 9/088* (2013.01); *Y02T 10/70* (2013.01); *Y02T 10/705* (2013.01); *Y02T 10/7005* (2013.01); *B60L 11/18* (2013.01); *B60L 15/38* (2013.01); *B60L 11/1877* (2013.01); *B60L 2260/32* (2013.01)
USPC ......................................................... 414/551

(58) Field of Classification Search
CPC ................................ B60P 1/22; G05D 1/0246
USPC ..................................... 701/28; 414/551–554
See application file for complete search history.

(56) References Cited

U.S. PATENT DOCUMENTS

| 3,913,758 A | 10/1975 | Faircloth et al. |
|---|---|---|
| 4,155,198 A | 5/1979 | Kelley |

(Continued)

FOREIGN PATENT DOCUMENTS

| DE | 3828447 A1 | 3/1990 |
|---|---|---|
| EP | 0195191 A1 | 9/1986 |

(Continued)

OTHER PUBLICATIONS

European Search Report for EP09711619, dated Apr. 4, 2013.

(Continued)

*Primary Examiner* — Jonathan Snelting
(74) *Attorney, Agent, or Firm* — Rajesh Vallabh; Foley Hoag LLP

(57) ABSTRACT

An adaptable handling system featuring a boundary subsystem and one or more robots. Each robot typically includes a chassis, a container lift mechanism moveable with respect to the robot chassis for transporting at least one container, a drive subsystem for maneuvering the chassis, a boundary sensing subsystem, a container detection subsystem, and a controller. The controller is responsive to the boundary sensing subsystem and the container detection subsystem and is configured to control the drive subsystem to follow a boundary once intercepted until a container is detected and turn until another container is detected. The controller then controls the container lift mechanism to place a transported container proximate the second detected container.

49 Claims, 17 Drawing Sheets

(56) References Cited

U.S. PATENT DOCUMENTS

| | | | |
|---|---|---|---|
| 4,217,073 A | 8/1980 | Propst | |
| 4,401,236 A | 8/1983 | Germaine | |
| 4,476,651 A | 10/1984 | Drury | |
| 4,522,546 A | 6/1985 | Ringer | |
| 4,700,301 A | 10/1987 | Dyke | |
| 4,749,327 A | 6/1988 | Roda | |
| 4,793,096 A | 12/1988 | Todd, Sr. | |
| 4,854,802 A | 8/1989 | deGroot | |
| 4,869,637 A | 9/1989 | deGroot | |
| 4,994,970 A | 2/1991 | Noji et al. | |
| 5,016,541 A | 5/1991 | Feaster, Jr. | |
| 5,020,964 A | 6/1991 | Hyatt et al. | |
| 5,020,965 A | 6/1991 | Tanaka et al. | |
| 5,046,914 A | 9/1991 | Holland et al. | |
| 5,051,906 A * | 9/1991 | Evans et al. | 701/28 |
| 5,081,941 A | 1/1992 | Weeks | |
| 5,085,553 A | 2/1992 | Bouwens et al. | |
| 5,160,235 A | 11/1992 | Bikow | |
| 5,181,818 A | 1/1993 | Tanaka et al. | |
| 5,211,523 A | 5/1993 | Andrada Galan et al. | |
| 5,315,517 A | 5/1994 | Kawase et al. | |
| 5,332,363 A | 7/1994 | Tanaka et al. | |
| 5,348,063 A | 9/1994 | Handleman | |
| 5,348,361 A | 9/1994 | Ilchuk | |
| 5,403,142 A | 4/1995 | Stewart | |
| 5,427,492 A | 6/1995 | Tanaka et al. | |
| 5,496,143 A | 3/1996 | Breyer | |
| 5,688,102 A | 11/1997 | Vieselmeyer | |
| 5,769,589 A | 6/1998 | Lubbers | |
| 5,819,863 A | 10/1998 | Zollinger et al. | |
| 5,842,306 A | 12/1998 | Onosaka et al. | |
| 5,959,423 A | 9/1999 | Nakanishi et al. | |
| 5,974,348 A | 10/1999 | Rocks | |
| 5,988,971 A | 11/1999 | Fossey et al. | |
| 6,164,537 A | 12/2000 | Mariani et al. | |
| 6,186,730 B1 | 2/2001 | Place | |
| 6,212,821 B1 | 4/2001 | Adam et al. | |
| 6,216,631 B1 | 4/2001 | Wissner-Gross | |
| 6,243,987 B1 | 6/2001 | Hessel | |
| 6,255,793 B1 | 7/2001 | Peless et al. | |
| 6,336,051 B1 | 1/2002 | Pangels et al. | |
| 6,347,920 B1 | 2/2002 | Place | |
| 6,389,329 B1 | 5/2002 | Colens | |
| 6,417,641 B2 | 7/2002 | Peless et al. | |
| 6,431,818 B1 | 8/2002 | Place | |
| 6,481,948 B2 | 11/2002 | Spears | |
| 6,496,755 B2 | 12/2002 | Wallach et al. | |
| 6,508,033 B2 | 1/2003 | Hessel et al. | |
| 6,532,404 B2 | 3/2003 | Colens | |
| 6,543,983 B1 | 4/2003 | Felder et al. | |
| 6,611,738 B2 | 8/2003 | Ruffner | |
| 6,638,004 B2 | 10/2003 | Berger et al. | |
| 6,658,324 B2 | 12/2003 | Bancroft et al. | |
| 6,667,592 B2 | 12/2003 | Jacobs et al. | |
| 6,729,836 B2 | 5/2004 | Stingel, III et al. | |
| 6,850,024 B2 | 2/2005 | Peless et al. | |
| 6,854,209 B2 | 2/2005 | Van Horssen et al. | |
| 6,857,493 B2 | 2/2005 | Shupp et al. | |
| 6,915,607 B2 | 7/2005 | Tagawa et al. | |
| 6,950,722 B2 | 9/2005 | Mountz | |
| 6,984,952 B2 | 1/2006 | Peless et al. | |
| 6,988,518 B2 | 1/2006 | Rackers | |
| 6,997,663 B2 * | 2/2006 | Siebenga | 414/111 |
| 7,069,111 B2 | 6/2006 | Glenn et al. | |
| 7,086,820 B1 | 8/2006 | Blake | |
| 7,137,770 B2 | 11/2006 | Ueda | |
| 7,184,855 B2 | 2/2007 | Stingel, III et al. | |
| 7,198,312 B2 | 4/2007 | Blaho | |
| 7,200,465 B2 | 4/2007 | Stingel, III et al. | |
| 7,261,511 B2 | 8/2007 | Felder et al. | |
| 7,274,167 B2 | 9/2007 | Kim | |
| 7,343,222 B2 | 3/2008 | Solomon | |
| 7,400,108 B2 | 7/2008 | Minor et al. | |
| 7,506,472 B2 | 3/2009 | Leyns et al. | |
| 7,559,736 B1 | 7/2009 | Mohan | |
| 7,579,803 B2 | 8/2009 | Jones et al. | |
| 7,610,122 B2 | 10/2009 | Anderson | |
| 7,613,544 B2 | 11/2009 | Park et al. | |
| 2001/0008112 A1 | 7/2001 | Opitz | |
| 2002/0120364 A1 | 8/2002 | Colens | |
| 2002/0146306 A1 | 10/2002 | Morrell | |
| 2002/0182046 A1 | 12/2002 | Schempf et al. | |
| 2003/0030398 A1 | 2/2003 | Jacobs et al. | |
| 2003/0118487 A1 | 6/2003 | Pressman et al. | |
| 2003/0165373 A1 | 9/2003 | Felder et al. | |
| 2003/0199944 A1 | 10/2003 | Chapin et al. | |
| 2004/0139692 A1 | 7/2004 | Jacobsen et al. | |
| 2005/0090961 A1 | 4/2005 | Bonk et al. | |
| 2005/0126144 A1 | 6/2005 | Koselka et al. | |
| 2005/0135912 A1 | 6/2005 | Schempf et al. | |
| 2005/0135913 A1 | 6/2005 | Visser | |
| 2005/0238465 A1 | 10/2005 | Razumov | |
| 2005/0246056 A1 | 11/2005 | Marks et al. | |
| 2005/0254924 A1 | 11/2005 | Swetman et al. | |
| 2005/0254927 A1 | 11/2005 | Swetman et al. | |
| 2005/0268987 A1 | 12/2005 | Rackers | |
| 2006/0045679 A1 | 3/2006 | Ostendorff | |
| 2006/0072988 A1 | 4/2006 | Hariki et al. | |
| 2006/0095169 A1 | 5/2006 | Minor et al. | |
| 2006/0120834 A1 | 6/2006 | Pressman et al. | |
| 2006/0213167 A1 | 9/2006 | Koselka et al. | |
| 2006/0221769 A1 | 10/2006 | Van Loenen et al. | |
| 2006/0257236 A1 | 11/2006 | Stingel, III et al. | |
| 2006/0293810 A1 | 12/2006 | Nakamoto | |
| 2007/0017181 A1 | 1/2007 | Jacobsen et al. | |
| 2007/0042803 A1 | 2/2007 | Anderson | |
| 2007/0129849 A1 | 6/2007 | Zini et al. | |
| 2007/0140821 A1 | 6/2007 | Garon et al. | |
| 2007/0152619 A1 | 7/2007 | Sugiyama et al. | |
| 2007/0219720 A1 | 9/2007 | Trepagnier et al. | |
| 2008/0046130 A1 | 2/2008 | Faivre et al. | |
| 2008/0131254 A1 | 6/2008 | Cope et al. | |
| 2008/0279663 A1 | 11/2008 | Alexander | |
| 2009/0012667 A1 | 1/2009 | Matsumoto et al. | |
| 2009/0021351 A1 | 1/2009 | Beniyama et al. | |
| 2009/0054222 A1 | 2/2009 | Zhang et al. | |
| 2009/0148034 A1 | 6/2009 | Higaki et al. | |
| 2009/0175709 A1 | 7/2009 | Okabe et al. | |
| 2009/0254217 A1 | 10/2009 | Pack et al. | |
| 2011/0025454 A1 | 2/2011 | Pomerantz et al. | |
| 2012/0114187 A1 | 5/2012 | Duarte | |
| 2013/0325159 A1 | 12/2013 | Kilibarda et al. | |

FOREIGN PATENT DOCUMENTS

| | | |
|---|---|---|
| EP | 0774702 A2 | 5/1997 |
| JP | S61204714 A | 9/1986 |
| JP | 03-285602 A | 12/1991 |
| JP | 07-065908 | 3/1995 |
| JP | 11-077579 | 3/1999 |
| JP | 2006-346767 A | 12/2006 |
| JP | 2007-508667 A | 4/2007 |
| JP | 2009-511288 A | 3/2009 |
| WO | WO 94/22094 | 9/1994 |
| WO | 99/59042 A1 | 11/1999 |
| WO | WO 2007/004551 | 6/2006 |
| WO | WO 2009/024246 A1 | 2/2009 |

OTHER PUBLICATIONS

International Search Report and Written Opinion for PCT/US2012/035480, dated Nov. 16, 2012.

International Searching Authority, Written Opinion of the International Searching Authority, International Application No. PCT/US2009/001031, mailed Apr. 20, 2009, 7 pages. (unnumbered).

European Examination Report for EP09711619, dated Nov. 4, 2013.

* cited by examiner

Consolidation

Collection

ADAPTABLE CONTAINER HANDLING SYSTEM

RELATED APPLICATIONS

This application hereby claims the benefit of and priority to U.S. Provisional Application Ser. No. 61/066,768, filed on Feb. 21, 2008 under 35 U.S.C. §§119, 120, 363, 365, and 37 C.F.R. §1.55 and §1.78.

FIELD OF THE INVENTION

The subject invention relates to nursery and greenhouse operations and to an adaptable container handling system including a robot which is able to pick up and transport containers such as plant containers to a specified location.

BACKGROUND OF THE INVENTION

Nurseries and greenhouses regularly employ workers to reposition plants such as shrubs and trees in containers on plots of land as large as thirty acres or more. Numerous, for example hundreds or even thousands of containers may be brought to a field and then manually placed in rows at a designated spacing. Periodically, the containers are respaced, typically as the plants grow. Other operations include jamming, (e.g., for plant retrieval in the fall), consolidation, and collection. See U.S. Patent Application No. 2005/0135912 incorporated herein by this reference.

The use of manual labor to accomplish these tasks is both costly and time consuming. But, attempts at automating such container handling tasks have met with limited success.

Large-scale or hard automation is practiced at some greenhouses especially in Europe. The "Walking Plant System" (WPS Horti System, BV) is one prominent greenhouse automation scheme. In this method, conveyor belts, tables on tracks, and other centrally controlled mechanisms maneuver containers throughout the entire production cycle—plants are never placed on an outdoor floor or on un-actuated surfaces. Thus, from seed to sale, virtually no direct human labor is needed.

Such hard automation methods can be cost effective where land and labor prices are high and in operations where only one variety of plant is produced. But, in other circumstances (more typical of the U.S.), this form of automation loses some of its advantage. Because the automation components are fully integrated into the greenhouse, hard automation installations cannot easily be scaled up or down in response to demand. Further, the initial costs of a hard automation system is very high—growers essentially purchase a plant factory.

Visser International Trade and Engineering, BV has automated one container manipulation task known as "spacing." Spacing involves positioning containers on an outdoor field or greenhouse floor with a surrounding buffer space so that plants have room to grow. A forklift-sized device called the "Space-O-Mat" uses multiple actuated forks to position plants in a regular pattern as the device backs up under autonomous control. The disadvantages of the Space-O-Mat become apparent when it is used on real-world field. If the surface is somewhat soft or uneven, the Space-O-Mat may fail to deposit containers properly. Also, many greenhouse are too tightly configured to accommodate Space-O-Mat.

A research project begun in 2000 and sponsored by NASA, Carnegie Mellon University, and the American Nurseries and Landscape Association developed a semi-autonomous device called Junior also intended to perform container spacing. Junior, a tractor-sized mechanism, automated part of the spacing task. Two workers move containers from a wagon to a conveyor on Junior that reaches across the wagon. The conveyor transports the plants to a mechanism with about a dozen grippers mounted on an arm. When each of the grippers has been loaded with a container, the arm activates. The arm maneuvers the plants onto the ground, spacing them relative to plants already on the ground. Then Junior backs up positioning itself to accept the next group of plants from the wagon.

Junior has not been developed into a commercial product. Were Junior to be offered for sale, it would likely have a high price. Junior is also a very complex piece of equipment and might require special expertise to operate. Because of its large size Junior cannot be used inside many greenhouses.

BRIEF SUMMARY OF THE INVENTION

It is therefore an object of the subject invention to provide a new robot for container handling.

It is a further object of the subject invention to provide a robot which is low cost, and simple and intuitive to operate.

It is a further object of the subject invention to provide such a robot which is simple in design and reliable.

It is a further object of the subject invention to provide such a robot which is small enough to maneuver indoors such as inside a typical greenhouse.

It is a further object of the subject invention to provide such a robot which eliminates much of the manual labor associated with nursery, greenhouse, and other growing operations.

It is a further object of the subject invention to provide such a robot which reliably operates even in adverse conditions.

It is a further object of the subject invention to provide such a robot which can operate for many hours and even work throughout the night.

It is a further object of the subject invention to provide such a robot which is able to place containers in their designated configuration with better accuracy than human workers.

It is a further object of the subject invention to provide a complete container handling system.

It is a further object of the subject invention to provide such a system which is scalable.

It is a further object of the subject invention to provide such a system which is safe.

The subject invention, however, in other embodiments, need not achieve all these objectives and the claims hereof should not be limited to structures or methods capable of achieving these objectives.

The subject invention features an adaptable container handling system including a boundary subsystem and one or more robots. Each robot typically includes a chassis, a container lift mechanism moveable with respect to the robot chassis for transporting at least one container, a drive subsystem for maneuvering the chassis, a boundary sensing subsystem, and a container detection subsystem. A robot controller is responsive to the boundary sensing subsystem and the container detection subsystem and is configured to control the drive subsystem to follow a boundary once intercepted until a container is detected and turn until another container is detected. The controller then controls the container lift mechanism to place a transported container proximate the second detected container.

In one preferred embodiment, the controller controls the drive subsystem to return the robot to a prescribed container source location and controls the container lift mechanism to retrieve another container at the source location. In one example, a transmitting beacon is located at the source transmitting a signal and each robot further includes a receiver for receiving the transmitted beacon signal. The boundary subsystem typically includes reflective tape which may include non-reflective portions denoting distance.

In one design, the boundary sensing subsystem includes at least one infrared emitter and at least one infrared detector and the container detection subsystem includes a linear array of infrared emitters and infrared detectors. In another design the container detection subsystem includes a camera based subsystem. One subsystem includes a laser source which emits a beam intersecting the field of view of the camera between $x_{min}$ and $x_{max}$. The detection subsystem determines the distance between the robot and a container as a function of the angle of the beam. The camera is preferably mounted such that pixels are read out as columns rather than rows. The beam may be turned off between read outs of adjacent columns and then laser off columns are subtracted from laser on columns.

The container detection subsystem may also includes a system configured to detect if a container is present in the container lift mechanism. One system includes an infrared source and an infrared detector.

The preferred drive subsystem includes a pair of driven wheels one on each side of the chassis. One container lift mechanism includes a rotatable yoke, a pair of spaced forks extending from the yoke for grasping a container, and a drive train driven in one direction to rotate the yoke to simultaneously extend and lower the forks and driven in the opposite direction to simultaneously retract and raise the forks. One preferred drive train includes a first sprocket rotatable with respect to the yoke, a second sprocket rotatable with respect to the chassis, a moving link associated with the yoke interconnecting the first and second sprockets, and a means for driving the second sprocket. The system also includes a motor driving a gearbox, a driver sprocket driven by the gearbox, a third sprocket driven by the driver sprocket and fixed to the second sprocket, and a fork extending from the moving link. A forward skid plate may be mounted to the robot chassis.

A typical user interface for the controller includes an input for setting the width of a bed, an input for setting a desired container spacing, an input for setting the desired spacing pattern, and an input for setting the desired container diameter The controller logic is typically configured to detect a container/boundary condition and to operate the drive subsystem and the container lift mechanism in response based on the condition. A first condition is no containers are detected before three boundaries are detected and a response to the first condition is to locate the third boundary or obstruction and place a transported container proximate the boundary or obstruction to place the first container in the first row. A second condition is no container is detected before two boundaries are detected and a response to the second condition is to follow the second boundary, detect a container, and place a transported container proximate the detected container to fill the first row with containers. A third condition is a first boundary is followed, a container is detected, the robot turns, but no additional containers are detected before a second boundary or obstacle is detected. A response to the third condition is to place a transported container proximate the second boundary or obstruction to fill a row with its first container.

One container handling robot in accordance with the subject invention may include a chassis; a drive subsystem for maneuvering the chassis; a container detection subsystem; and a container lift mechanism. There is a rotatable yoke, a pair of spaced forks extending from the yoke for grasping a container, and a drive train driven in one direction to rotate the yoke to simultaneously extend and lower the forks and drivable in an opposite direction to simultaneously retract and raise the forks.

A preferred version of the robot further includes a controller responsive to the container detection subsystem and configured to control the drive subsystem until a container is detected and to control the container lift mechanism to place a container carried by the forks proximate the detected container.

One adaptable plant container handling robot in accordance with the subject invention features a chassis; a container lift mechanism moveable with respect to the robot chassis for retrieving at least one container in a field at a first location, a drive subsystem for maneuvering the chassis to transport the container to a second location, a boundary sensing subsystem, a container detection subsystem, and a controller. The controller is responsive to the boundary sensing subsystem and the container detection subsystem and is configured to control the drive subsystem to follow a boundary once intercepted until a container at the second location is detected and turn until another container is detected, and control the container lift mechanism to place a transported container proximate the second detected container.

The subject invention also features a plant container handling robot including a chassis, a drive subsystem for maneuvering the chassis, and a container detection subsystem including a subsystem which detects containers on the ground, and a subsystem which detects a container carried by the robot. A container lift mechanism includes a rotatable yoke, a pair of spaced forks extending from the yoke for grasping a container, and a drive train which simultaneously extends and lowers the forks and simultaneously retracts and raises the forks. A controller is responsive to the container detection subsystem and configured to control the drive subsystem to maneuver the robot until a container is detected, control the container lift mechanism drive train to place a container carried by the forks proximate the detected container, control the drive subsystem to return the robot to a prescribed source location, and control the container lift mechanism drive train to retrieve another container at the source location.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
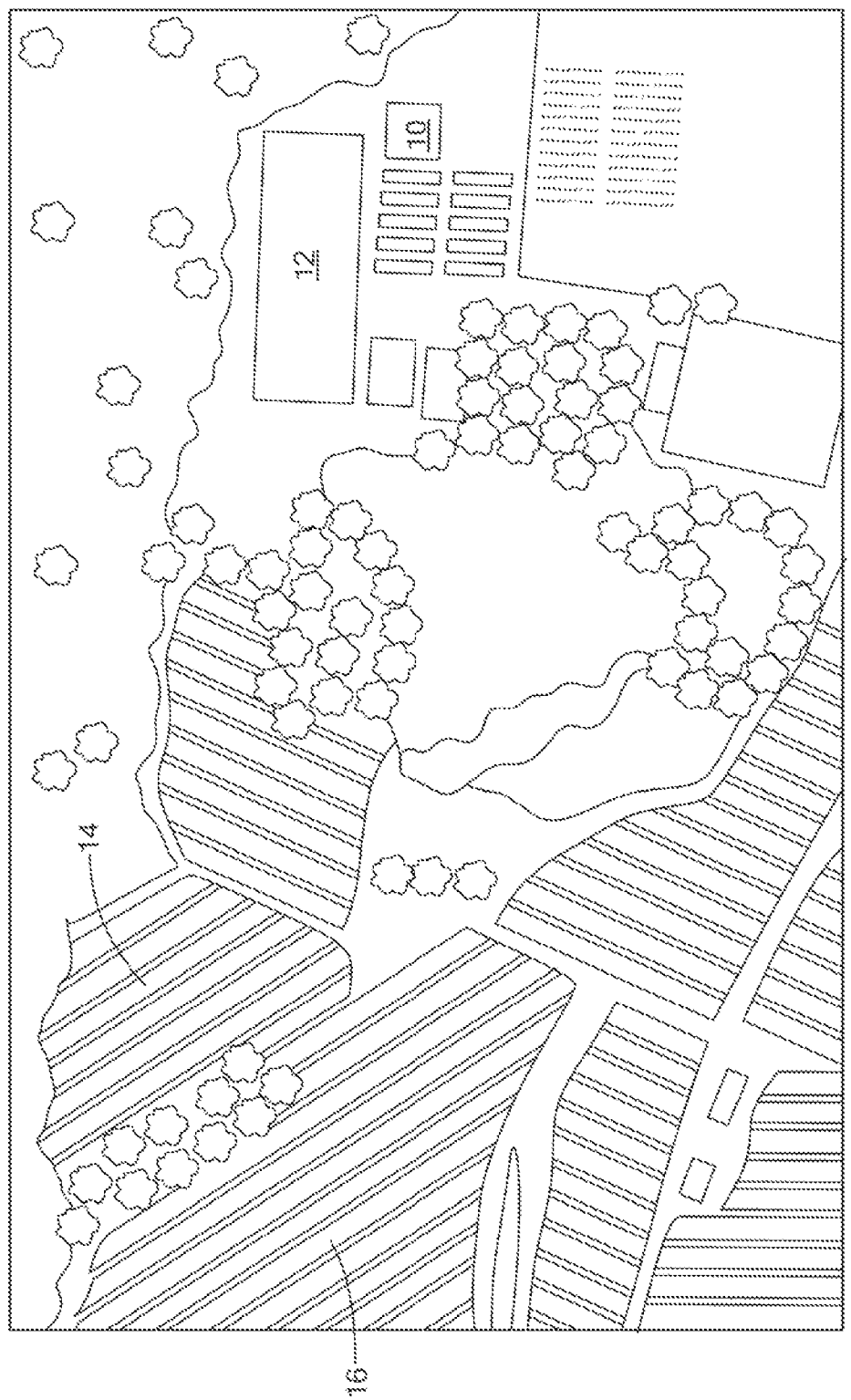
FIG. 1 is a schematic aerial view of a typical nursery operation.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows a typical container farm where seedlings are placed in containers in building 10. Later, the plants are moved to greenhouse 12 and then, during the growing season, to fields 14, 16 and the like where the containers are spaced in rows. Later, as the plants grow, the containers may be repositioned (re-spacing). At the end of the growing season, the containers may be brought back into greenhouse 12 and/or the plants sold. The Background section above delineates other typical nursery and greenhouse operations. The use of manual labor to accomplish these tasks is both costly and time consuming. And, as noted in the Background section above, attempts at automating these tasks have been met with limited success.

Figure 2:
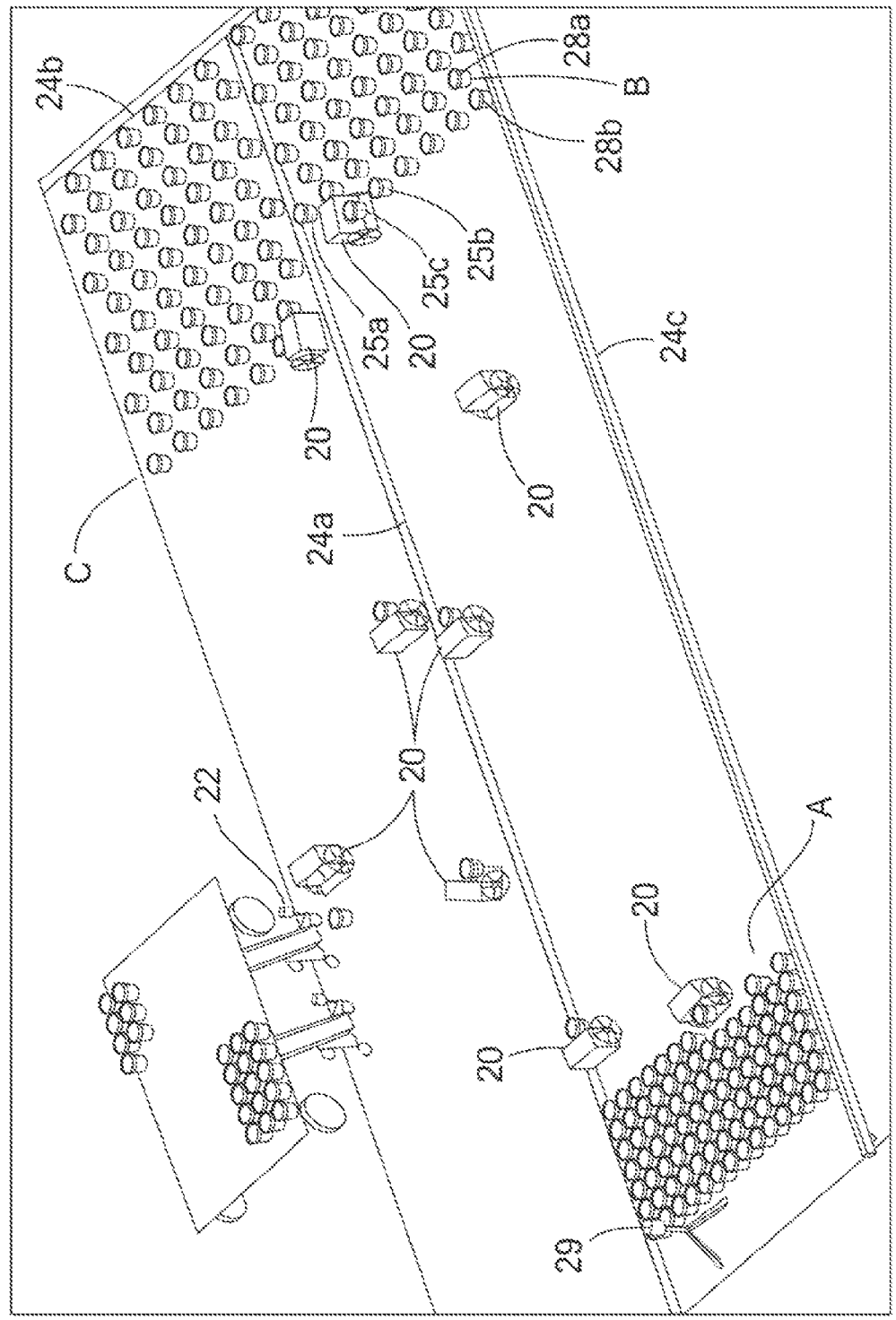
FIG. 2 is a highly schematic three-dimensional top view showing several robots in accordance with the subject invention repositioning plant containers in a field.

In accordance with the subject invention, autonomous robots 20, FIG. 2 transport plant containers from location A where the containers are "jammed" to location B where the containers are spaced apart in rows as shown. Similarly, robots 20 can retrieve containers from offloading mechanism 22 and space the containers apart in rows as shown at location C. Boundary marker 24a, in one example, denote the separation between two adjacent plots where containers are to be placed. Boundary marker 24b denotes the first row of each plot. Boundary marker 24c may denote the other side of a plot. Or, the plot width is an input to the robot. In one embodiment, the boundary markers include retro-reflective tape laid on the ground. The reflective tape could include non-reflective portions denoting distance and the robots could thereby keep track of the distance they have traveled. Other markings can be included in the boundary tape. Natural boundary markers may also be used since many growing operations often include boards, railroad ties, and other obstacles denoting the extent of each plot and/or plot borders. Typically, at least main boundary 24a is a part of the system and is a length of retro-reflective tape. Other boundary systems include magnetic strips, visible non-retroreflective tape, a signal emitting wire, passive RFID modules, and the like.

Figure 3:
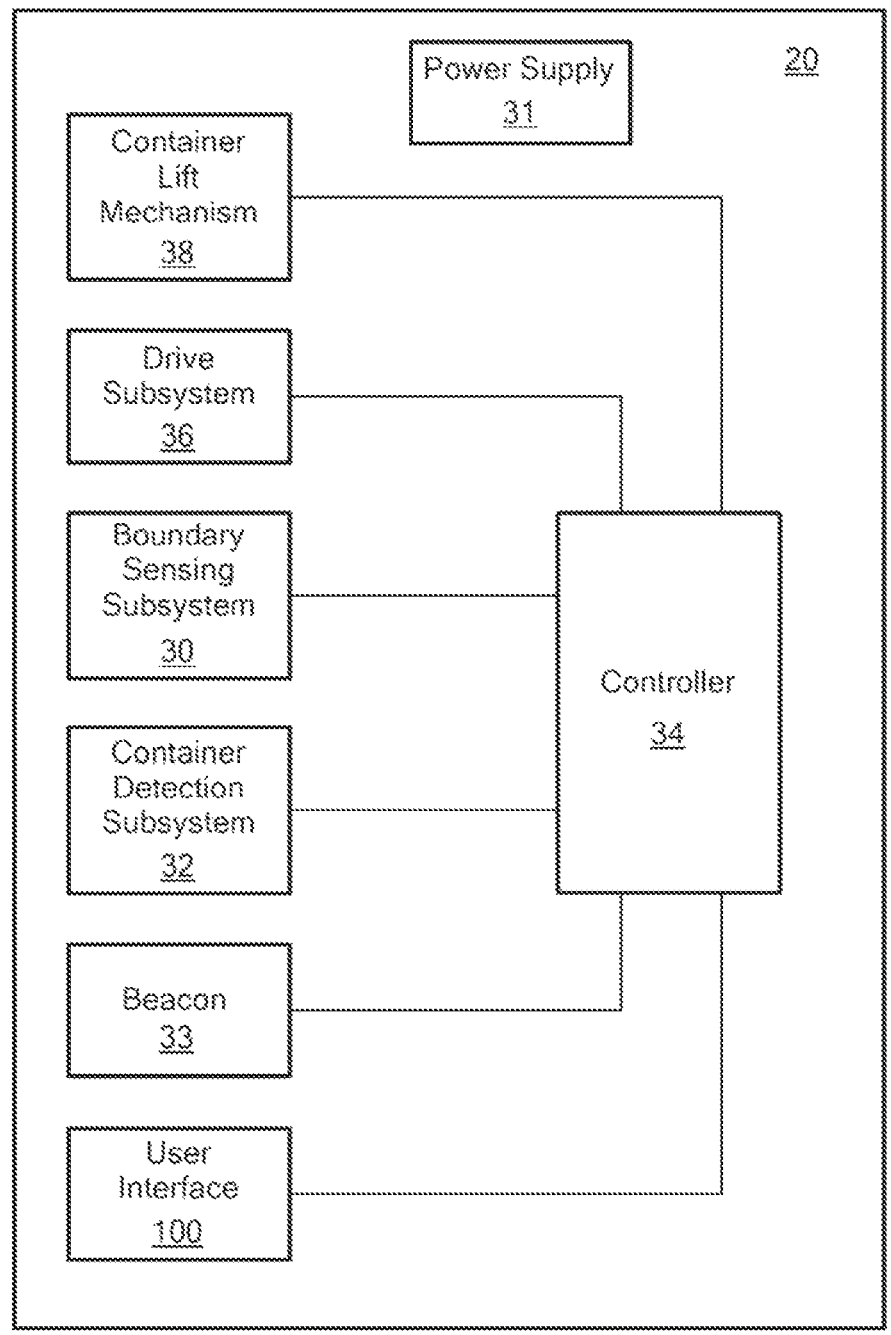
FIG. 3 is a block diagram depicting the primary subsystems associated with a container handling robot in accordance with an example of the subject invention.

Each robot 20, FIG. 3 typically includes boundary sensing subsystem 30 for detecting the boundaries and container detection subsystem 32 which typically detects containers ready for transport, already placed in a given plot, and being carried by the robot.

Electronic controller 34 is responsive to the outputs of both boundary sensing subsystem 30 and container detection subsystem 32 and is configured to control robot drive subsystem 36 and container lift mechanism 38 based on certain robot behaviors as explained below. Controller 34 is also responsive to user interface 100. The controller typically includes one or more microprocessors or equivalent programmed as discussed below. The power supply 31 for all the subsystems typically includes one or more rechargeable batteries located in the rear of the robot.

Figure 4A:
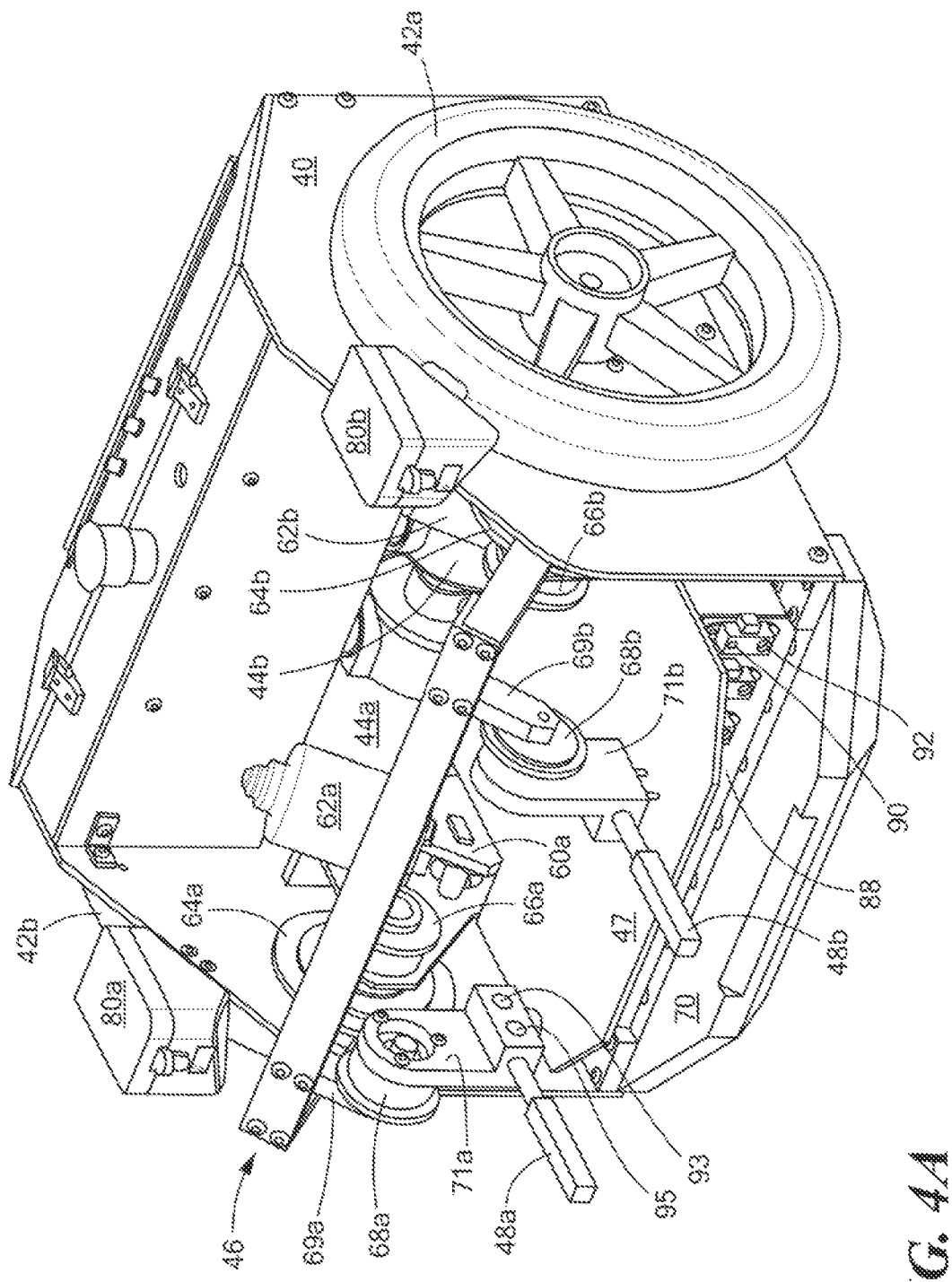
FIGS. 4A-4B are schematic three-dimensional front views showing an example of one container handling robot design in accordance with the subject invention.
Figure 4B:
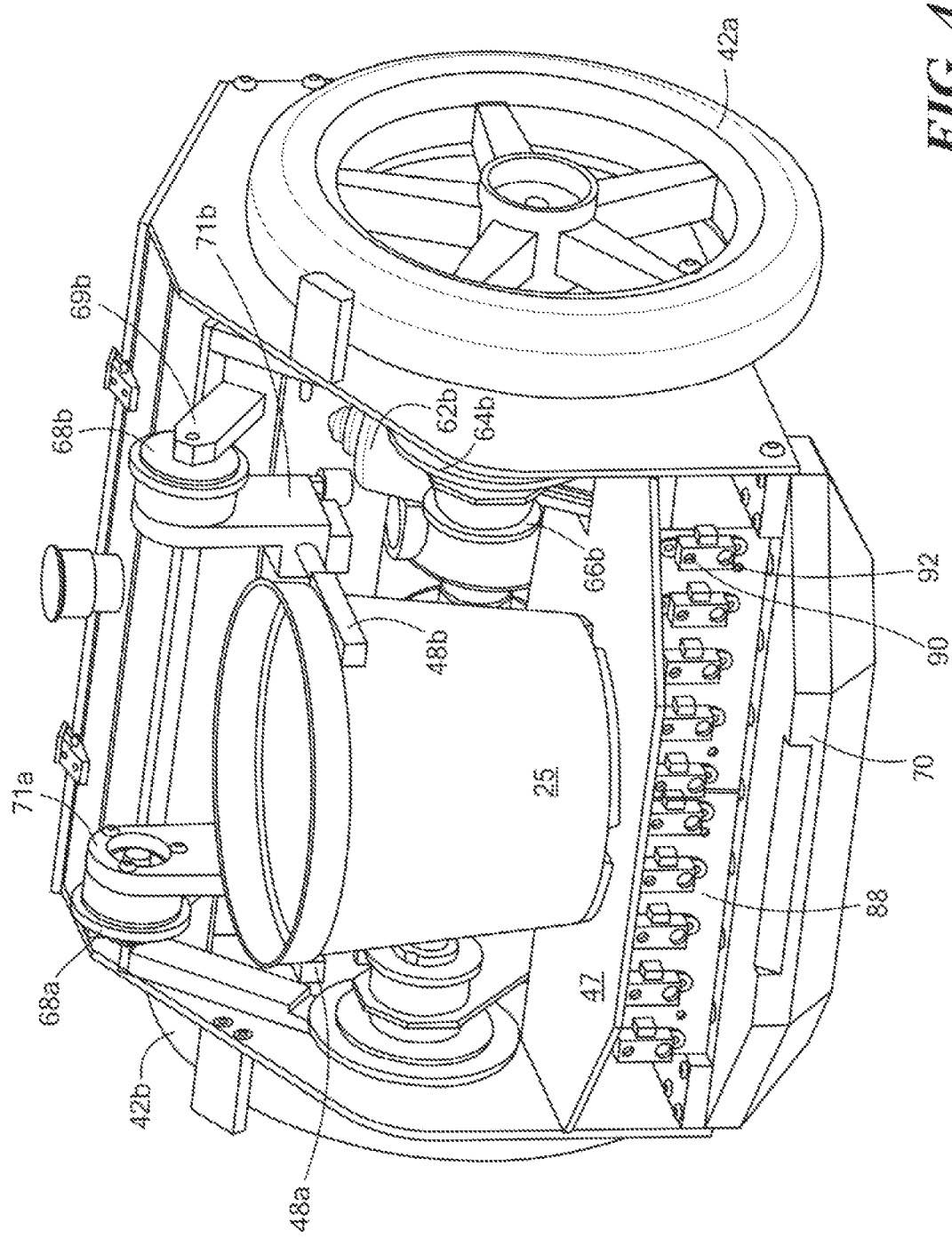

In one particular example, robot 20, FIGS. 4A-4B includes chassis 40 with opposing side wheels 42a and 42b driven together or independently by two motors 44a and 44b and a drive train, not shown. Yoke 46 is rotatable with respect to chassis 40. Spaced forks 48a and 48b extend from yoke 46 and are configured to grasp a container. The spacing between forks 48a and 48b can be manually adjusted to accommodate containers of different diameters. In other examples, yoke 46 can accommodate two or even more containers at a time. Container shelf 47 is located beneath the container lifting forks to support the container during transport.

Figure 5A:
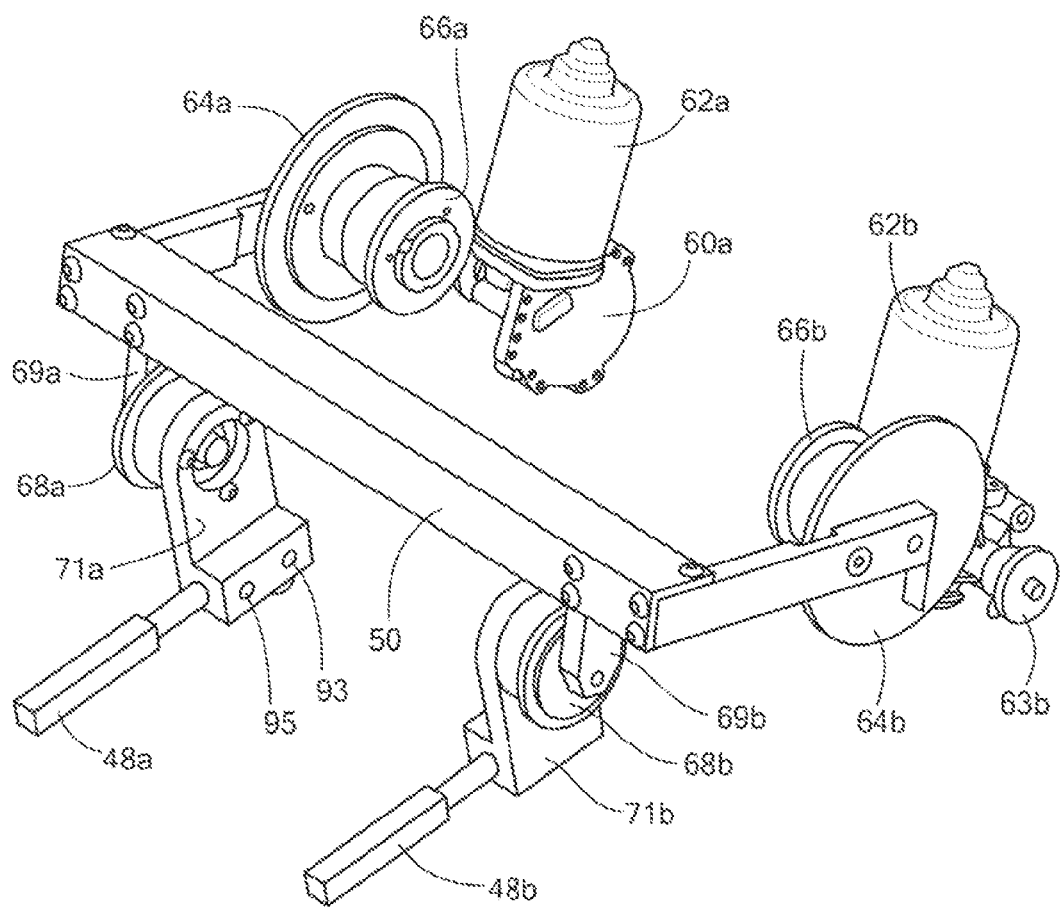
FIGS. 5A-5B are schematic three-dimensional rear views showing the primary components associated with the container lift mechanism of the robot shown in FIG. 4.
Figure 5B:
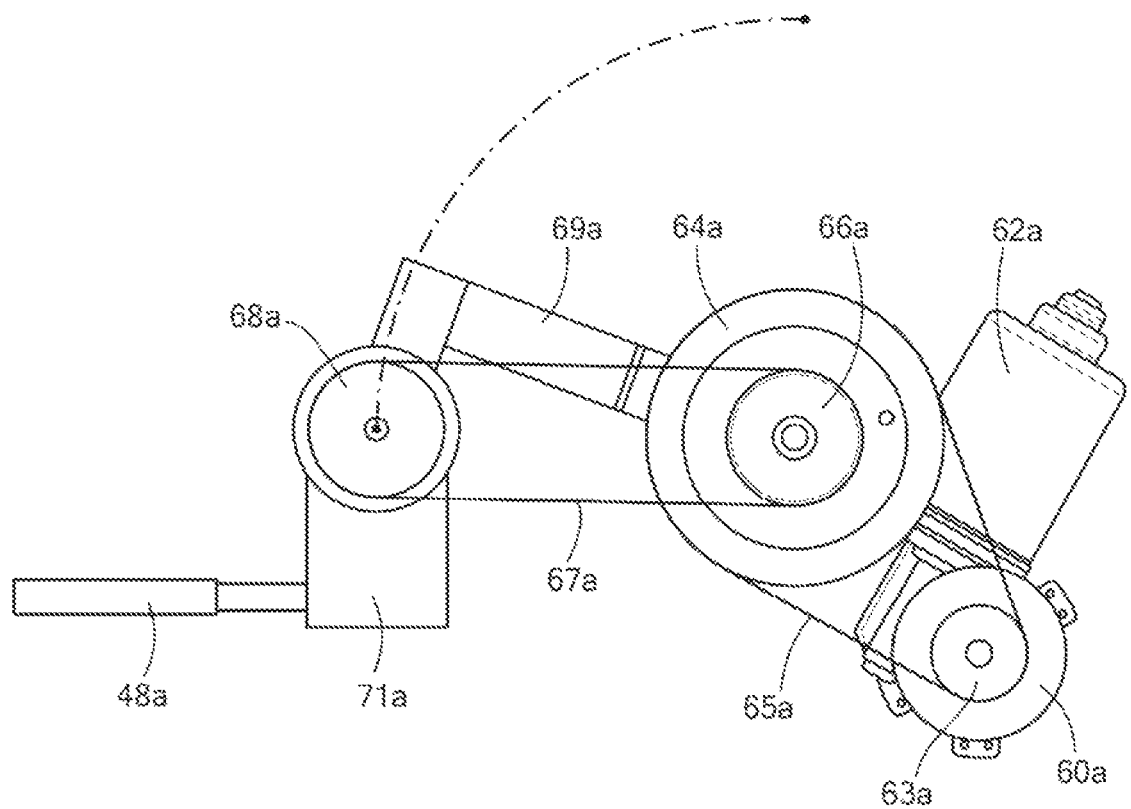

A drive train is employed to rotate yoke 46, FIGS. 5A-5B. As best shown in FIG. 5B, gearbox 60a is driven by motor 62a. Driver sprocket 63a is attached to the output shaft of gearbox 60a and drives large sprocket 64a via belt or chain 65a. Large sprocket 64a is fixed to but rotates with respect to the robot chassis. Sprocket 66a rotates with sprocket 64a and, via belt or chain 67a, drives sprocket 68a rotatably disposed on yoke link 69a interconnecting sprockets 64a and 68a. Container fork 48a extends from link 71a attached to sprocket 68a. FIGS. 4A, 4B, and 5A show that a similar drive train exists on the other side of the yoke. The result is a yoke which, depending on which direction motors 62a and 62b turn, extends and is lowered to retrieve a container on the ground and then raises and retracts to lift the container all the while keeping forks 48a and 48b and a container located therebetween horizontal.

FIGS. 4A-4B also show forward skid plate 70 typically made of plastic (e.g., UHMW PE) to assist in supporting the chassis. Boundary sensor modules 80a and 80b each include an infrared emitter and infrared detector pair. The container detection subsystem in this example includes linear array 88 of alternating infrared emitter and detection pairs, e.g., emitter 90 and detector 92. This subsystem is used to detect containers already placed to maneuver the robot accordingly to place a carried container properly. This subsystem is also used to maneuver the robot to retriever a container for replacement. The container detection subsystem typically also includes an infrared emitter detector pair 93 and 95 associated with fork 48a aimed at the other fork which includes reflective tape. A container located between the forks breaks the beam. In this way, controller 34 is informed whether or not a container is located between the forks. Other detection means may be used. Thus, container detection subsystem 32, FIG. 3 may include a subsystem for determining if a container is located between forks 48a and 48b, FIGS. 4-5. Controller 34, FIG. 3 is responsive to the output of this subsystem and may control drive subsystem 36, FIG. 3 according to one of several programmed behaviors. In one example, the robot returns to the location of beacon 29, FIG. 2 and attempts to retrieve another container. If the robot attempts to retrieve a container there but is unsuccessful, the robot may simply stop operating. In any case, the system helps ensure that if a container is present between forks 48a and 48b, FIG. 4, controller 34 does not control the robot in a way that another container is attempted to be retrieved.

In one preferred embodiment, controller 34, FIG. 3 is configured, (e.g., programmed) to include logic which functions as follows. Controller 34 is responsive to the output of boundary sensing subsystem 30 and the output of container detection subsystem 32. Controller 34 controls drive subsystem 36, (e.g., a motor 44, FIG. 4 for each wheel) to follow a boundary (e.g., boundary 24a, FIG. 2) once intercepted until a container is detected (e.g., container 25a, FIG. 2 in row 28a). Controller 34, FIG. 3 then commands drive subsystem 36 to turn to the right and maneuver in a row (e.g., row 28b, FIG. 2) until a container in that row is detected (e.g., container 25b, FIG. 2). Based on a prescribed container spacing criteria (set via user interface 100 FIG. 3, for example), the robot then maneuvers and controller 34 commands lift mechanism 38, FIG. 3 to place container 25c (the present container carried by the robot) in row 28b, FIG. 2 proximate container 25b.

Controller 34, FIG. 3 then controls drive subsystem 36 to maneuver the robot to a prescribed container source location (e.g., location A, FIG. 2). The system may include radio frequency or other (e.g., infrared) beacon transmitter 29 in which case robot 20, FIG. 3 would include a receiver 33 to assist robot 20 and returning to the container source location (may be based on signal strength). Dead reckoning, boundary following, and other techniques may be used to assist the robot in returning to the source of the containers. Also, if the robot includes a camera, the source of containers could be marked with a sign recognizable by the camera to denote the source of containers.

Once positioned at the container source location, controller 34 controls drive subsystem 36 and lift mechanism 38 to retrieve another container as shown in FIG. 2.

FIG. 6 depicts additional possible programming associated with controller 34, FIG. 3. FIG. 6A shows how a robot is able to place the first container in the first row in a given plot. Here, no containers are detected and the robot follows boundaries 24a and 24b. In this case, when boundary 24c is detected, controller 34, FIG. 3 commands the robot to place container 27a proximate boundary 24c in the first row. Note that boundaries 24a through 24c may be reflective tape as described above and/or obstructions typically associated with plots at the nursery site. Any boundary could also be virtual, (e.g., a programmed distance). In FIG. 6B, the robot follows boundary 24a and arrives at boundary 24b and detects no container. In response, controller 34, FIG. 3 commands the robot to follow boundary 24b until container 27a is detected. The container carried by the robot, in this case, container 27b, is then deposited as shown. In a similar fashion, the first row is filled with containers 27a-27d as shown in FIG. 6C. To place the first container in second row, container 27e, the container 27d in the first row is detected before boundary 24b is detected and the robot turns in the second row but detects boundary 24c before detecting a container in that row. In response, controller 34, FIG. 3 commands the robot to maneuver and place container 27e, FIG. 6C in the second row proximate boundary 24c.

Figure 6A:
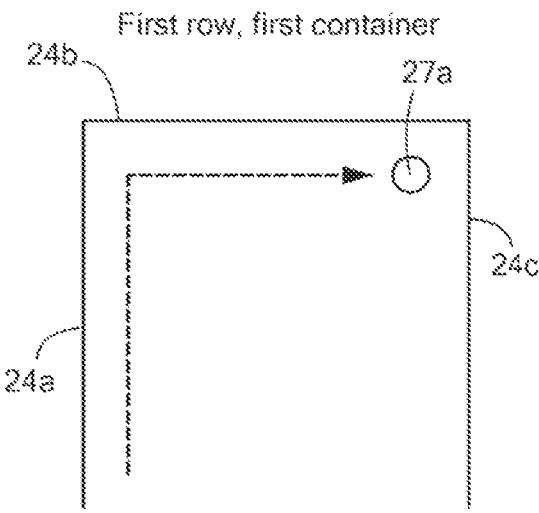
FIG. 6A-6D are highly schematic depictions showing the main algorithms carried out by the controller of the robot shown in FIGS. 3 and 4.
Figure 6B:
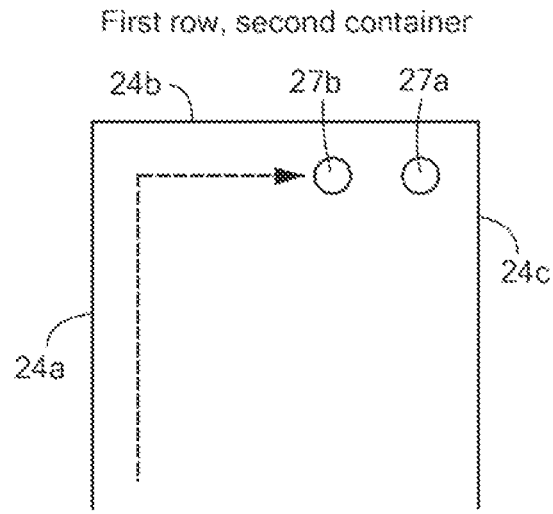
Figure 6C:
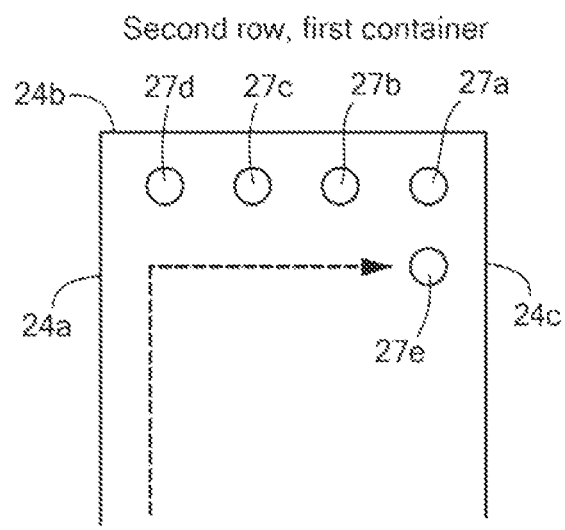
Figure 6D:
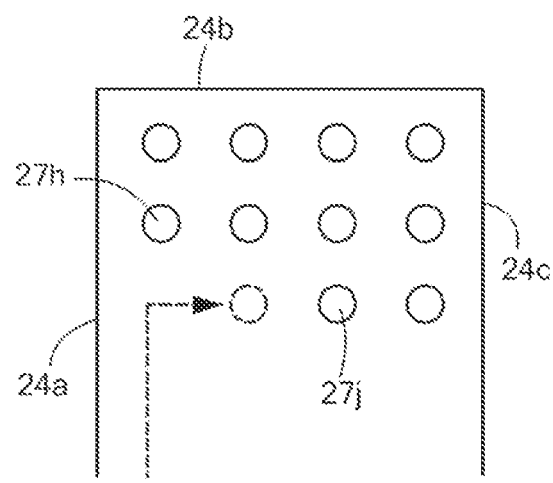

Thereafter, the remaining rows are filled with properly spaced containers as shown in FIG. 6D and as explained above with reference to FIG. 2. FIG. 6 shows the robot turning 90° but the robot could be commanded to turn at the other angles to create other container patterns. Other condition/response algorithms are possible.

Figure 7A:
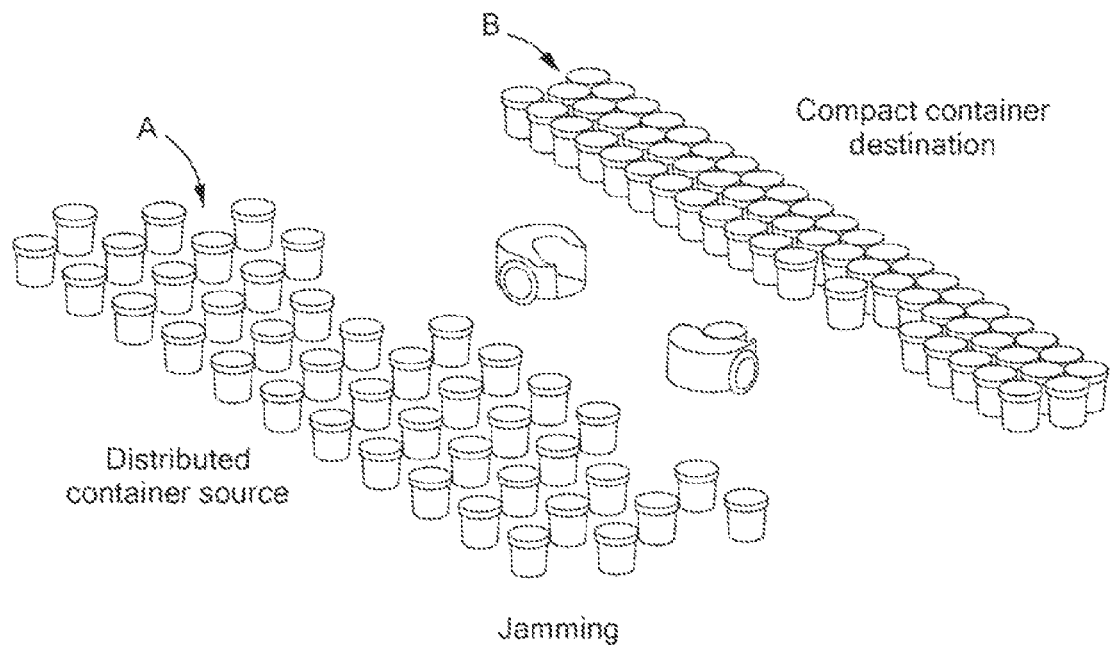
FIGS. 7A-7D are highly schematic depictions showing four different tasks which can be carried out by the robots of the subject invention.
Figure 7B:
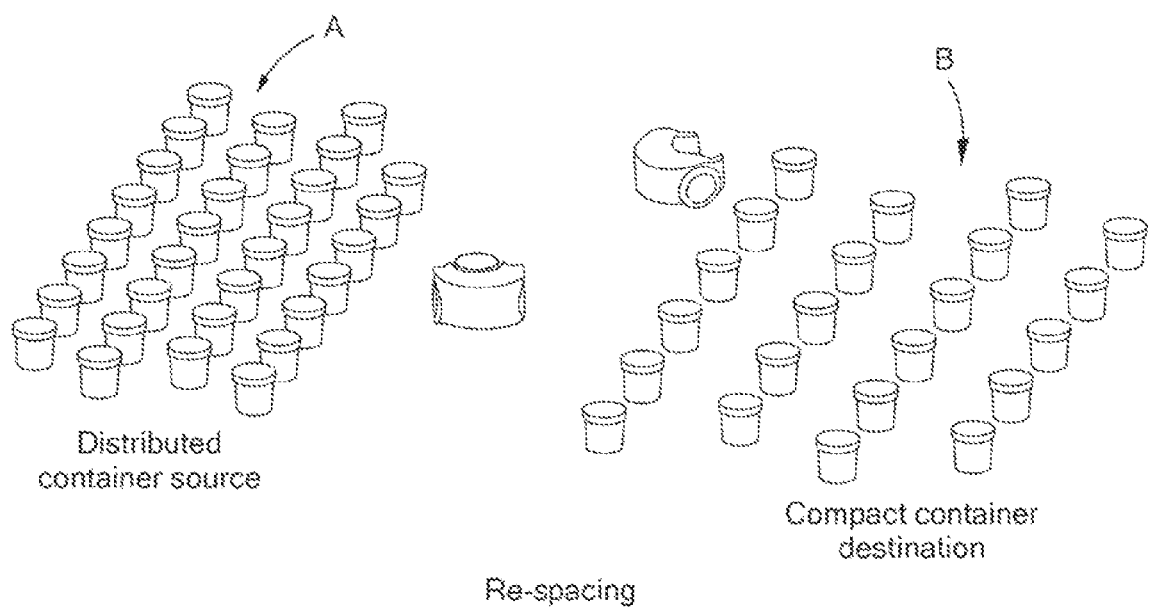
Figure 7C:
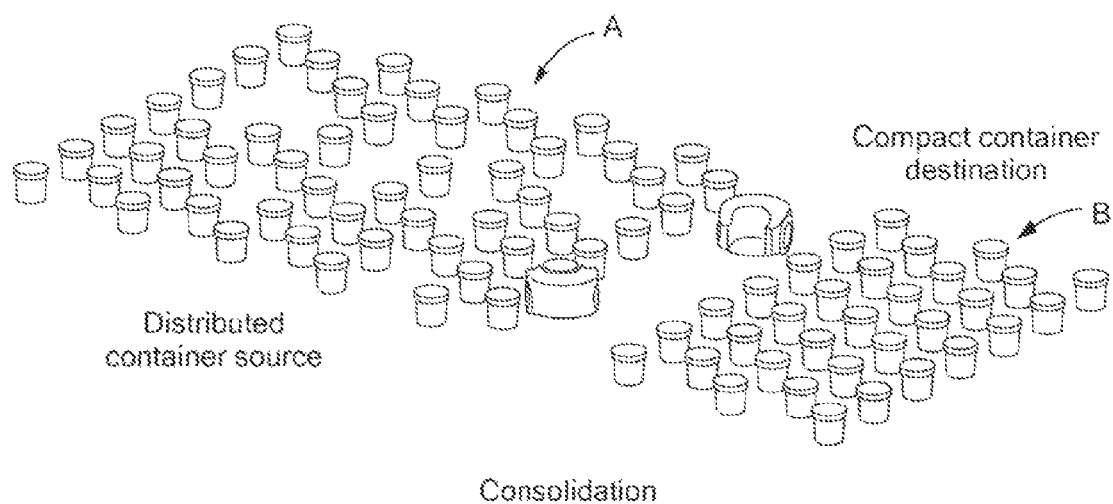
Figure 7D:
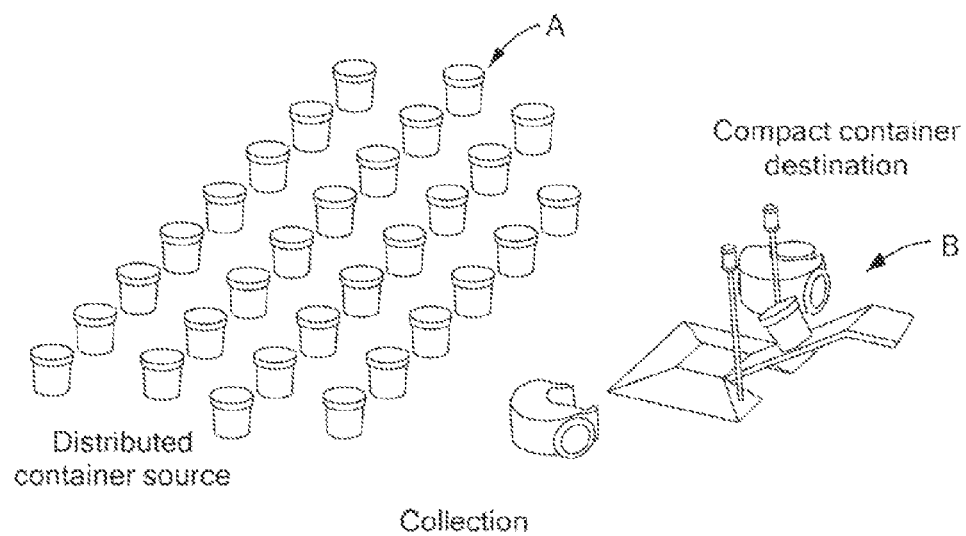

In this way, distributed containers at source A, FIG. 7A, can be "jammed" at location B; distributed containers at location A, FIG. 7B can be respaced at location B; distributed containers at location A, FIG. 7C can be consolidated at location B; and/or distributed containers at location A, FIG. 7D can be transported to location B for collection.

Using multiple fairly inexpensive and simple robots which operate reliably and continuously, large and even moderately sized growing operations can save money in labor costs.

Figure 8:
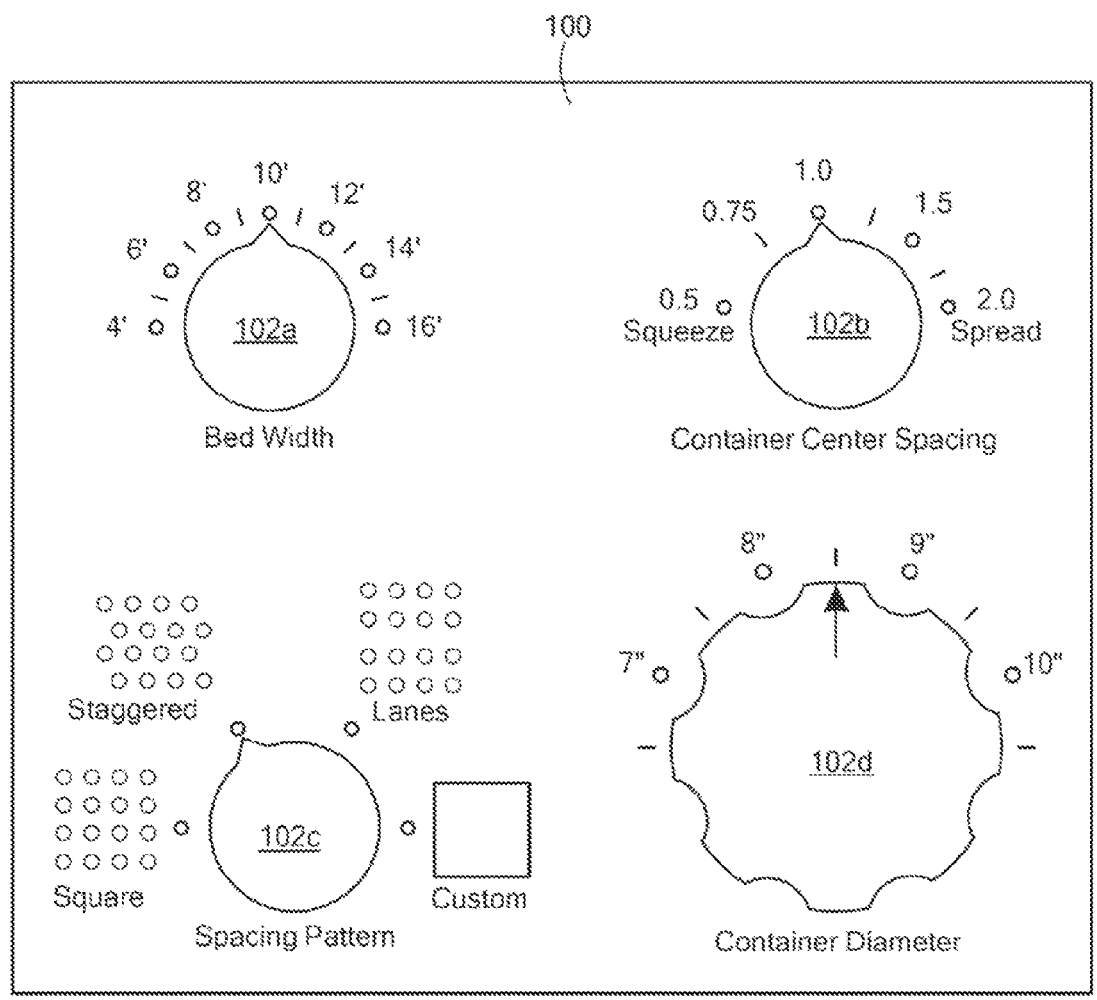
FIG. 8 is a schematic front view showing one example of a user interface for the robot depicted in FIGS. 3 and 4.
Figure 9:
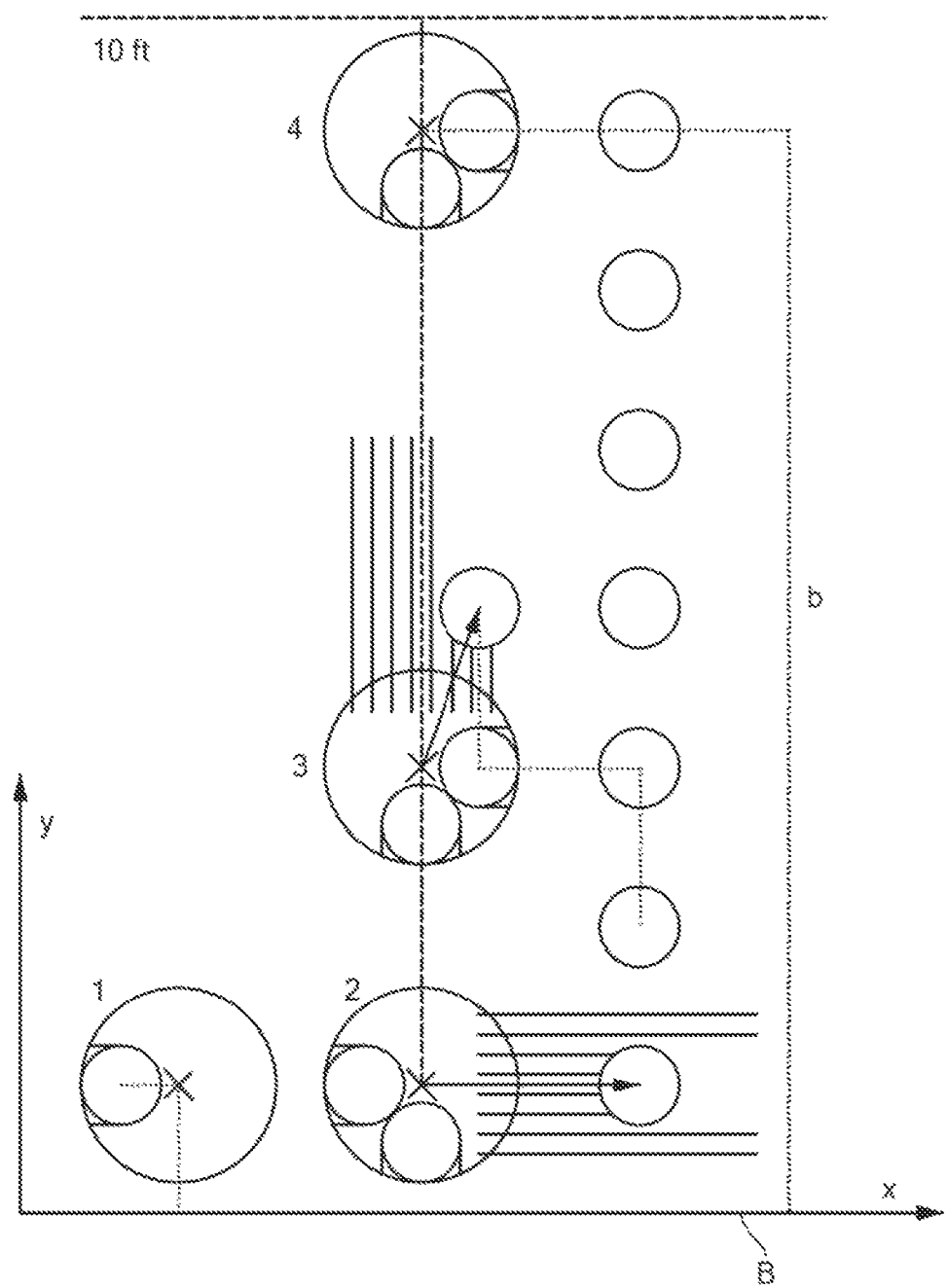
FIG. 9 is a schematic view depicting how a robot is controlled to properly space containers in a field.

FIG. 8 shows an example of a robot user interface 100 with input 102a for setting the desired bed width. This sets a virtual boundary, for example, boundary 24c, FIG. 2. Input 102b allows the user to set the desired container spacing. Input 102c allows the user to set the desired spacing pattern. Input 102d allows the user to set the desired container diameter. The general positioning of features on the robot are shown in FIG. 4 discussed above. The boundary sensor enables the robot to follow the reference boundary; the container sensors locate containers relative to the robot. The preferred container lifter is a one-degree-of-freedom mechanism including forks that remain approximately parallel with the ground as they swing in an arc to lift the container. Two drive wheels propel the robot. The robots perform the spacing task as shown in FIG. 9 in position 1, the robot follows the boundary B. At position 2, the robot's container sensor beams detect a container. This signifies that the robot must turn left so that it can place the container it carries in the adjacent row (indicated by the vertical dashed line). The robot typically travels along the dashed line using dead-reckoning. At position 3, the robot detects a container ahead. The robot computes and determines the proper placement position for the container it carries and maneuvers to deposit the container there. Had there been no container at position 3, the robot would have traveled to position 4 to place its container. The user typically dials in the maximum length, b, of a row. The computation of the optimal placement point for a container combines dead-reckoning with the robot's observation of the positions of the already-spaced containers. Side looking detectors may be used for this purpose.

The determination of the position of a container relative to the robot may be accomplished several ways. In one example, a camera-based container detection system includes a camera and source of structured light mounted on the robot R, FIG. 10A. The field of view of the camera (FOV) intersects with a wedge of light (L) produced by a laser or other source. In the absence of ambient light, the only pixels illuminated in the camera image are those where the light wedge intersects an obstacle that is within the field of view of both camera and light source. The height of a pixel in the image codes for the range of the object. One novel aspect of the subject invention is the way in which ambient light is eliminated from the image even when the robot moves at high speed in full sun.

The structured light container measurement system may be a camera-based system designed to measure the x-y position of containers within the field of view of a camera at a relatively short range. The system is largely unaffected by ambient light, is unaffected by robot speeds of up to two meter per second or more, and is very low in cost compared to more conventional systems.

Figure 10A:
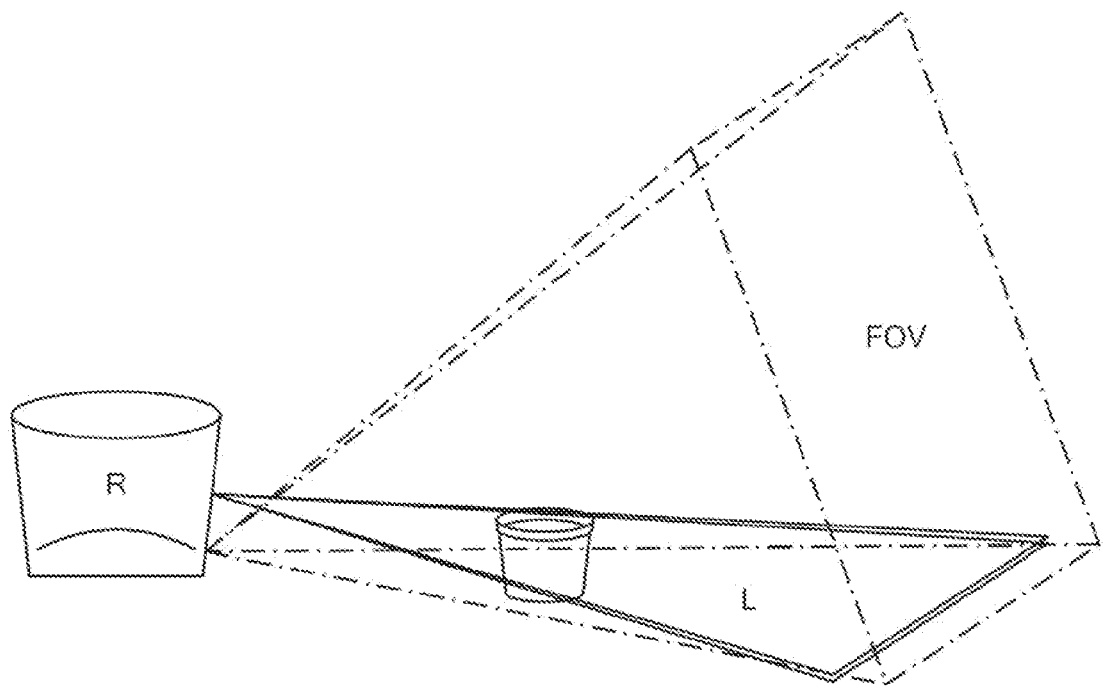
FIGS. 10A-10B are highly schematic views explaining a camera-based container detection system useful in connection with the subject invention.
Figure 10B:
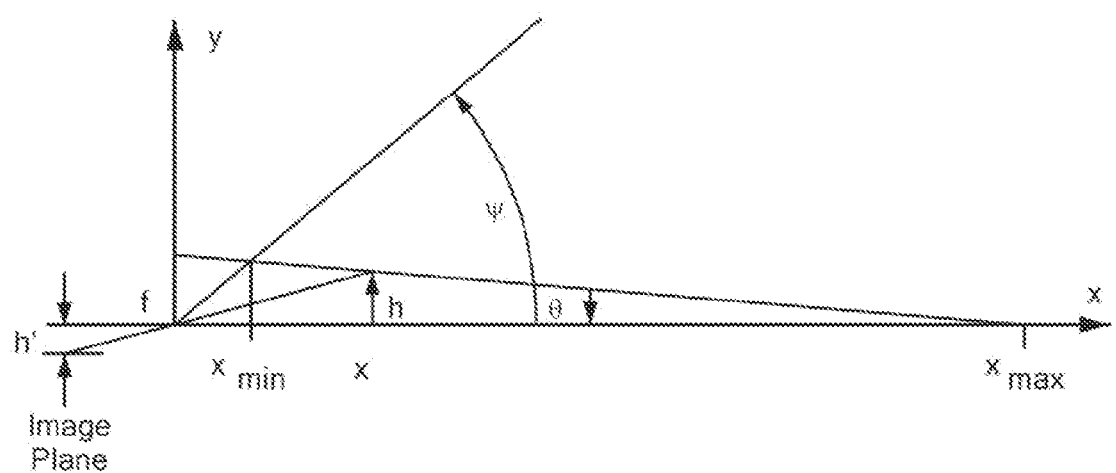

In this system, the field of view of a camera intersects a flat wedge of laser light, as shown in FIG. 10A. The camera points along the direction of robot travel but angled up; the laser wedge also points forward but tilts downward. In FIG. 10B, the camera, located at the origin, has a field of view of angle $\psi$. The camera is positioned such that the x-axis of the coordinate system is aligned with the lower edge of the camera's field of view. The laser (L) intersects the camera's field of view between $x_{min}$ and $x_{max}$ and makes an angle $\theta$ with the x-axis. A cylindrical lens spreads the beam from the laser into a wedge coming out of the page. The camera is able to detect any object within the range $x_{min}$ to $x_{max}$. When an object is at x the laser intersects the object at y=h. On the image plane of camera (a distance f from the origin) the height of h' is measured.

From FIG. 1:

$$h'/f = h/x, \text{ and} \quad (1)$$

$$\tan(\theta) = h/(x_{max} - x) \quad (2)$$

from which the following can be derived:

$$h' = f\tan(\theta)(x_{max} - x)/x, \text{ and} \quad (3)$$

$$x = (f\tan(\theta)x_{max})/(h' + f\tan(\theta)) \quad (4)$$

This novel system has the poorest resolution at the greatest distance and improves as the object moves toward the camera. For a typical system, $x_{max}$ may be about 2 m, $\theta$ about 5 degrees, and $\psi$ is, 40 degrees. $\Theta$ is determined by noting that h at $x_{min}$ must approximately match the height of the smallest container the system needs to see, e.g., 6". At $x_{max}$, h'=0, assume that an object is located 1 cm closer than this. In this way, $h'/f = 4.34 \times 10^{-5}$.

If the object were at $x_{min}$ (which can be computed to be 18.9 cm) then, $$h'/f = 0.008. \quad (6)$$

The ratio of these two values of h'/f is about 181. Thus the system can detect a difference of 1 cm at its maximum range if the camera field of view is 40 degrees and the camera has at least 181 pixels in the vertical dimension. At distances of less than $x_{max}$, changes of 1 cm in range produce a greater than one pixel difference in the image.

The container measurement system also employs a novel method to identify the structured light signal in the image. This system is low in cost because it requires minimal computation and storage can use a slow (30 Hz) low-resolution camera. Yet, it is able to deliver rapid, accurate container positioning at all light levels.

The container measurement system uses triangulation and structured light to compute the range to a container. The key challenge in such a system is to identify pixels in the image that are illuminated by the structured laser light and reject pixels that are not. The traditional method for accomplishing this is frame differencing. Here the structured light source is turned on, and an image is recorded, the light source is turned off and a second image is recorded. Next, the second image is subtracted from the first on a pixel-by-pixel basis. If the only change between the two images is the presence of the structure light in the first then the only non-zero pixels in the difference correspond to structured light. Two drawbacks to the use of this method in a robot in accordance with the subject invention are as follows. First, the robots move rapidly and thus the constraint that nothing changes between images except the structured light is not satisfied. Second, the fact that two complete images must be stored and differenced adds storage and computation requirements thus increasing cost.

The inventive container measuring system works as follows. The camera is turned to 90 degrees to its normal mounting position so that pixels normally exposed and read out in rows are read out as columns. The structured light (a plane of laser light) is synchronized to column exposure. That is, the laser is turned on, a row is exposed and read out, then the laser is turned off, and the adjacent row is exposed and read out, and so on. The detail in a typical image can be expected not to change very much from one column to the next. Thus when the laser-off column is subtracted from the adjacent laser-on column, the largest value in the difference will correspond to pixels illuminated by the laser. Further, since cameras typically have more than 100 columns per frame, the robot will move two orders of magnitude less between the processing of two columns than it moves between the time two frames are processed.

Depending on its velocity, the robot may move significantly during the time required to process a frame one column at a time. However, because the speed of the robot is known, it is possible to eliminate the resulting motion distortion from the data. Finally, besides the ability to expose and read out image data one column at a time, the structured light system places no unusual demands on the camera. The camera's built-in facilities for automatic gain adjustment should enable it to operate under all light conditions. If rather than the column-differencing scheme described above, a conventional frame-differencing scheme were used to measure the containers, the standard the camera would have to meet to ensure that the difference between two images was almost entirely due to the modulation of the structured light source rather than the motion of other image features is explained as follows. From the geometry above, the most rapid change in image position occurs when an object is near $x_{min}$. If a CIF camera chip with 288 lines is used it turns out that a change of one line in the image corresponds to a motion of 1.15 mm in x when the object is near $x_{min}$. At 2.0 m/s it takes the robot just 0.00115/2.0=575 µs to move that far. Thus to cancel the effects of motion the camera would have to grab an image 1739 times per second. Cameras that operate at this high frame rate are considerably more expensive than lower speed cameras. However, for objects near $x_{max}$, a standard 30 Hz camera would be sufficient. Thus, an alternate strategy could attempt to detect objects when they are far away using a 30 Hz camera and slow the robot down before the object reaches $x_{min}$. This requires that the velocity be about 58 times slower near $x_{min}$ than at 2.0 meters or 3.4 cm/s. This speed constraint would limit the utility of the system.

Figure 11:
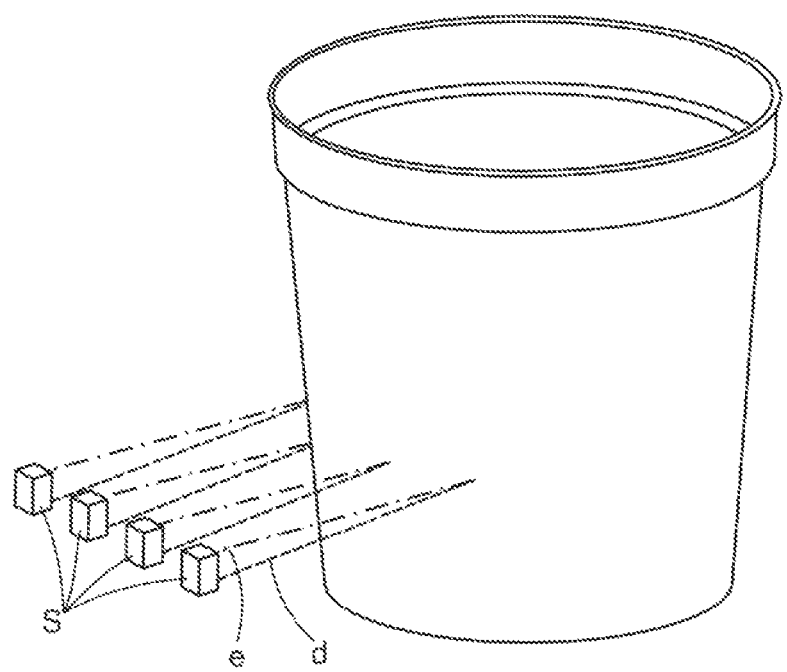
FIG. 11 is a highly schematic view of another container detection system including infrared ranging sensors.

Focused light or an infrared source could be used. The container detection system can also be implemented using discrete components rather than a camera. In FIG. 11, a collection of IR ranging sensors (S) measures the distance from robot to container. Emitted beams (e) and detection paths (d) are shown.

Figure 12:
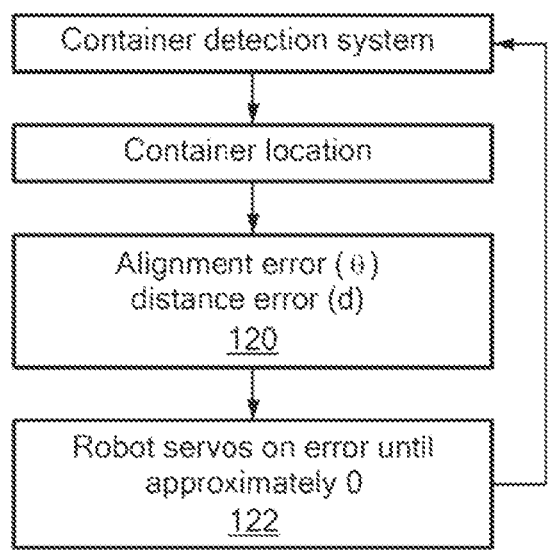
FIG. 12 is a flow chart depicting the primary steps associated with an algorithm for picking up containers in accordance with the subject invention.
Figure 13A:
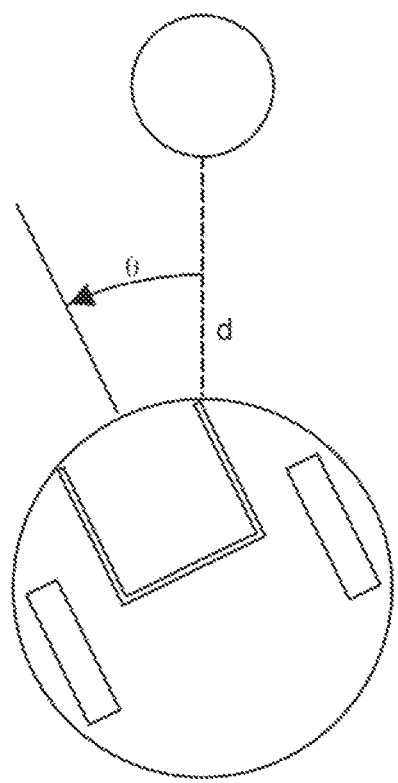
FIGS. 13A-D are views of a robot maneuvering to pick up a container according to the algorithm depicted in FIG. 12.
Figure 13B:
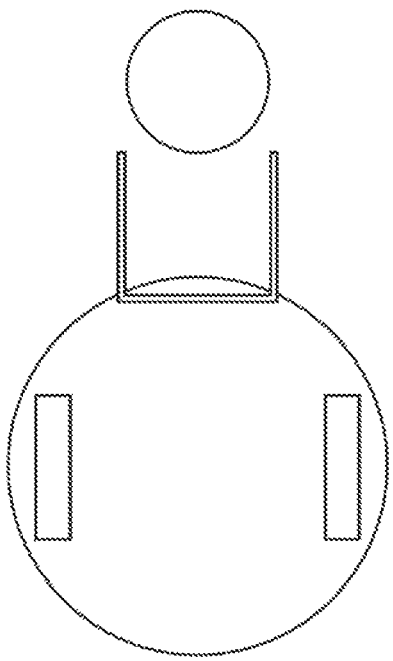
Figure 13C:
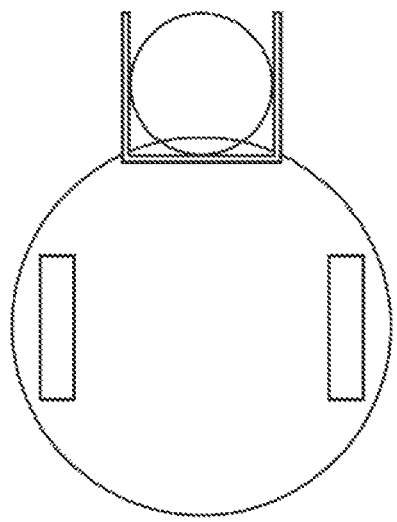
Figure 13D:
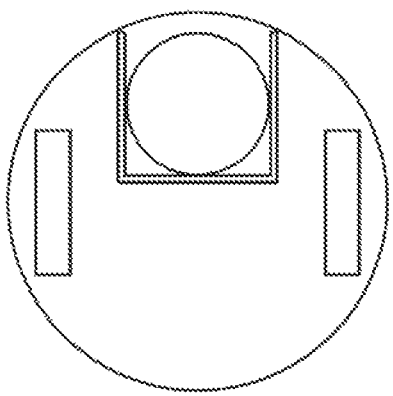

A flowchart of the container centering/pickup method is shown in FIG. 12. FIG. 13 depicts the steps the robot performs. In step 120, the robot servos to within a fixed distance d, FIG. 13A of the container with the forks retracted. The robot is accurately aligned for container pickup when angle $\Theta$ is zero. In step 122, FIG. 12, the robot extends the forks and drives forward while servoing to maintain alignment, FIG. 13B. In FIG. 13C, the robot detects the container between its forks and stops its forward motion. In FIG. 13D, the robot retracts the forks by sweeping through an arc. This motion captures the container and moves it within the footprint of the robot.

The preferred system of the subject invention minimizes cost by avoiding high-performance but expensive solutions in favor of lower cost systems that deliver only as much performance as required and only in the places that performance is necessary. Thus navigation and container placement are not typically enabled using, for example a carrier phase differential global positioning system. Instead, a combination of boundary following, beacon following, and dead-reckoning techniques are used. The boundary subsystem of the subject invention provides an indication for the robot regarding where to place containers greatly simplifying the user interface.

The boundary provides a fixed reference and the robot can position itself with high accuracy with respect to the boundary. The robot places containers within a few feet of the boundary. This arrangement affords little opportunity for dead-reckoning errors to build up when the robot turns away from the boundary on the way to placing a container.

After the container is deposited, the robot must return to collect the next container. Containers are typically delivered to the field by the wagonload. By the time one wagonload has been spaced, the next will have been delivered further down the field. In order to indicate the next load, the user may position a beacon near that load. The robot follows this procedure: when no beacon is visible, the robot uses dead-reckoning to travel as nearly as possible to the place it last picked up a container. If it finds a container there, it collects and places the container in the usual way. If the robot can see the beacon, it moves toward the beacon until it encounters a nearby container. In this way, the robot is able to achieve the global goal of spacing all the containers in the field, using only local knowledge and sensing. Relying only on local sensing makes the system more robust and lower in cost.

Users direct the robot by setting up one or two boundary markers, positioning a beacon, and dialing in several values. No programming is needed. The boundary markers show the robots where containers are to be placed. The beacon shows the robots where to pick up the containers.

Figure 14:
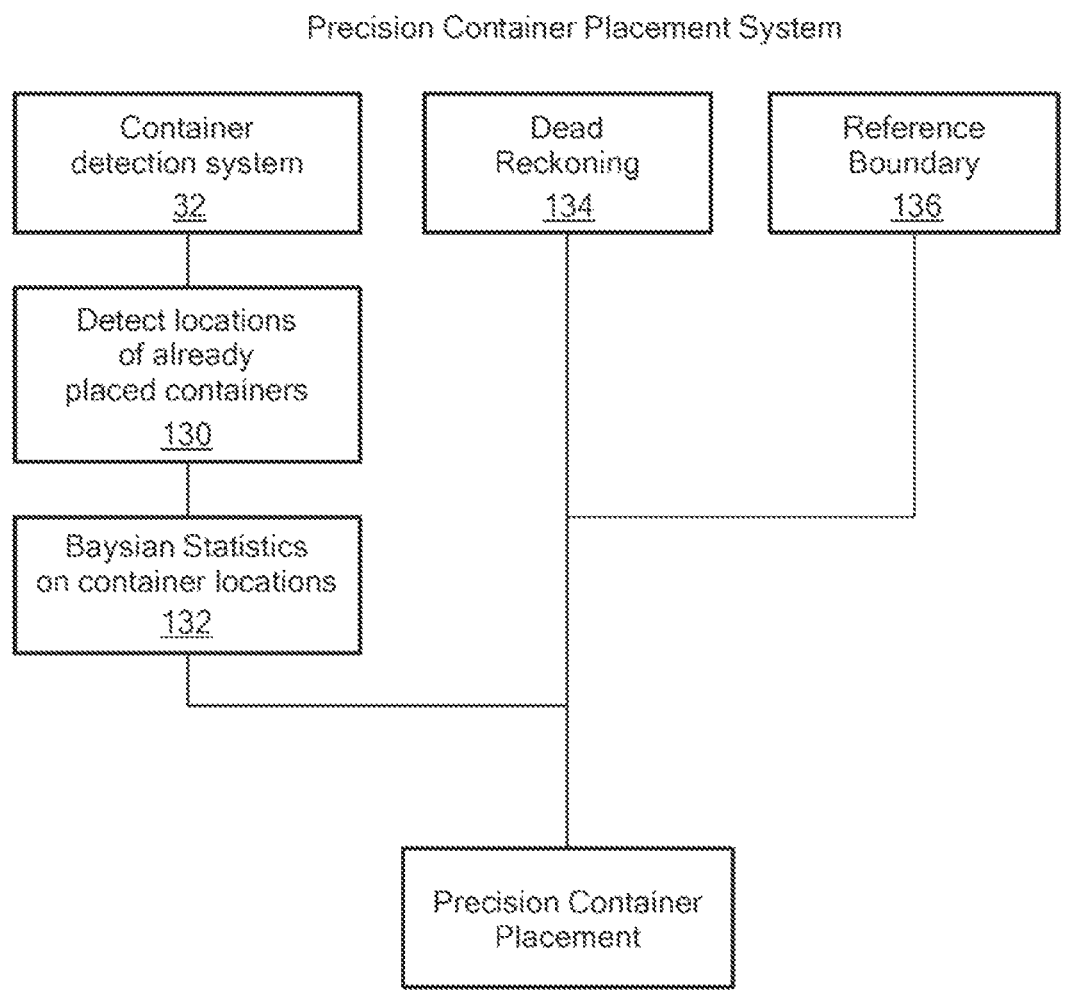
FIG. 14 is a block diagram depicting the primary subsystems associated with precision container placement techniques associated with the subject invention.

FIG. 14 depicts how, in one example, the combination of container detection system 32, the detection of already placed containers (130), the use of Baysian statistics on container locations (132), dead reckoning (134), and boundary referencing (136) is used to precisely place containers carried by the robots.

Figure 15:
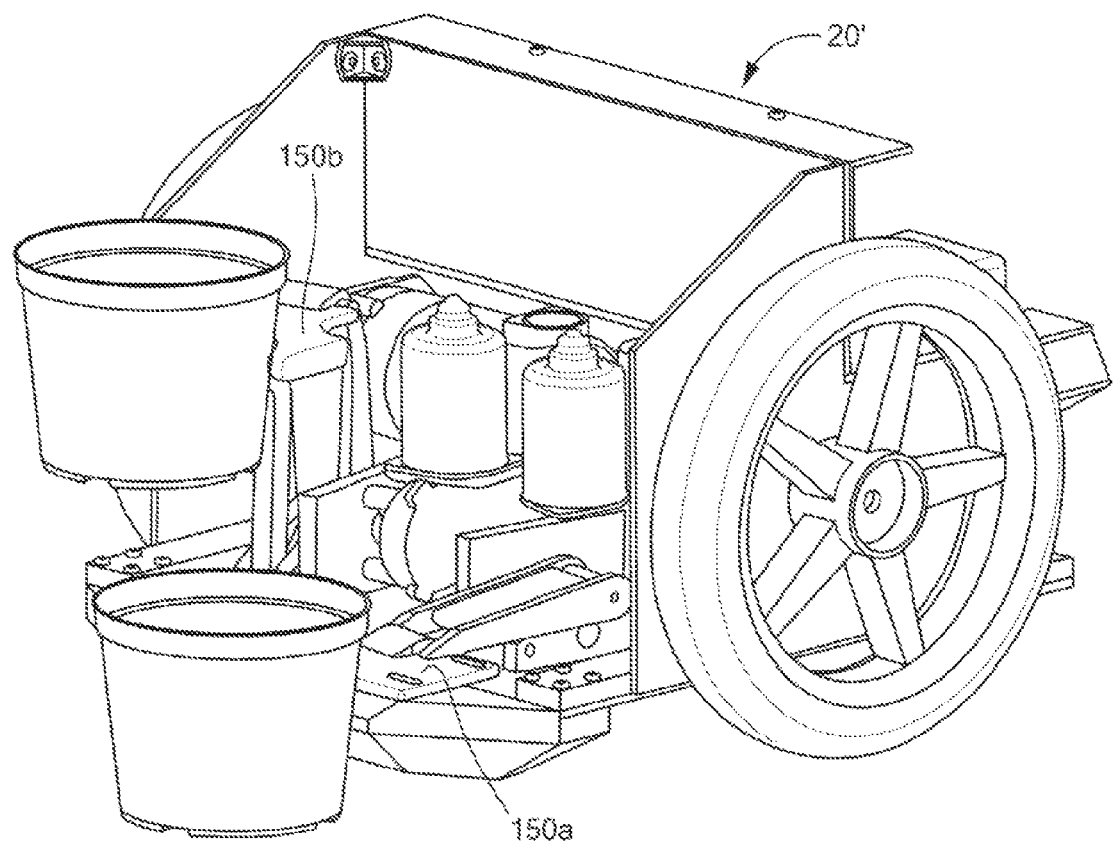
FIG. 15 is a schematic front view of a robot in accordance with the subject invention configured to transport two containers.

FIG. 15 shows a robot 20' with dual container lifting mechanisms 150a and 150b in accordance with the subject invention. In other embodiments, the lifting mechanism or mechanisms are configured to transport objects other than containers for plants, for example, pumpkins and the like.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the robot system disclosed herein may be used for tasks other than those associated with growing operations.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An adaptable container handling system comprising:
a boundary subsystem; and
one or more of robots each including:
   a chassis,
   a container lift mechanism moveable with respect to the robot chassis for transporting at least one container,
   a drive subsystem for maneuvering the chassis,
   a boundary sensing subsystem,
   a container detection subsystem, and
   a controller receiving outputs from and being responsive to the boundary sensing subsystem and the container detection subsystem, said controller comprising one or more processors programmed with logic instructions, which when executed by the one or more processors, cause the one or more processors to:
      control the drive subsystem to follow a boundary once intercepted until a container is detected and turn until another container is detected, and
      control the container lift mechanism to place a transported container proximate the second detected container.

2. The system of claim 1 in which the controller is further configured to control the drive subsystem to return the robot to a prescribed container source location.

3. The system of claim 1 in which the controller is further configured to control the container lift mechanism to retrieve another container at the source location.

4. The system of claim 2 further including a transmitting beacon located at the source location transmitting a signal and each robot further includes a receiver for receiving the transmitted beacon signal.

5. The system of claim 1 in which the boundary subsystem includes reflective tape.

6. The system of claim 5 in which the reflective tape includes non-reflective portions denoting distance.

7. The system of claim 5 in which the boundary sensing subsystem includes at least one infrared emitter and at least one infrared detector.

8. The system of claim 1 in which the container detection subsystem includes a linear array of infrared emitters and infrared detectors.

9. The system of claim 1 in which the container detection subsystem includes a camera based subsystem.

10. The system of claim 9 in which the camera based subsystem includes a laser source which emits a beam intersecting a field of view of a camera between $x_{min}$ and $x_{max}$.

11. The system of claim 10 in which the container detection subsystem determines a distance between the robot and a container as a function of an angle of the beam.

12. The system of claim 10 in which the camera is mounted such that pixels are read out as columns rather than rows.

13. The system of claim 12 in which the beam is turned off between read outs of adjacent columns and laser off columns are subtracted from laser on columns.

14. The system of claim 1 in which the container detection subsystem includes a system configured to detect if a container is present in said container lift mechanism.

15. The system of claim 1 in which the container detection subsystem includes an infrared source and an infrared detector.

16. The system of claim 1 in which the drive subsystem includes a pair of driven wheels one on each side of the chassis.

17. The system of claim 1 in which the container lift mechanism includes:
a rotatable yoke,
a pair of spaced forks extending from the yoke for grasping a container, and
a drive train driven in one direction to rotate the yoke to simultaneously extend and lower the forks and driven in the opposite direction to simultaneously retract and raise the forks.

18. The system of claim 17 in which the drive train includes:
a first sprocket rotatable with respect to the yoke,
a second sprocket rotatable with respect to the chassis, and
a moving link associated with the yoke interconnecting the first and second sprockets.

19. The system of claim 18 further including means for driving the second sprocket.

20. The system of claim 19 in which said means includes:
a motor driving a gearbox,
a driver sprocket driven by the gearbox, and
a third sprocket driven by the driver sprocket and fixed to the second sprocket.

21. The system of claim 18 in which a fork extends from the moving link.

22. The system of claim 1 further including a forward skid plate mounted to the robot chassis.

23. The system of claim 1 further including a user interface and the controller is responsive to the user interface.

24. The system of claim 23 in which the user interface includes an input for setting a width of a bed.

25. The system of claim 23 in which the user interface includes an input for setting a desired container spacing.

26. The system of claim 23 in which the user interface includes an input for setting a desired spacing pattern.

27. The system of claim 23 in which the user interface includes an input for setting a desired container diameter.

28. The system of claim 1 in which the controller is further configured to detect a container/boundary condition and to operate the drive subsystem and the container lift mechanism in response based on the condition.

29. The system of claim 28 in which a first condition is no containers are detected before three boundaries are detected.

30. The system of claim 29 in which a response to the first condition is to locate the third boundary or obstruction and place a transported container proximate the boundary or obstruction to place the first container in the first row.

31. The system of claim 28 in which a second condition is no container is detected before two boundaries are detected.

32. The system of claim 31 in which a response to the second condition is to follow the second boundary, detect a container, and place a transported container proximate the detected container to fill the first row with containers.

33. The system of claim 28 in which a third condition is a first boundary is followed, a container is detected, the robot turns, but no additional containers are detected before a second boundary or obstacle is detected.

34. The system of claim 33 in which a response to the third condition is to place a transported container proximate the second boundary or obstruction to fill a row with its first container.

35. An adaptable plant container handling robot comprising:
a chassis;
a container lift mechanism moveable with respect to the robot chassis for retrieving at least one container in a field at a first location;
a drive subsystem for maneuvering the chassis to transport the container to a second location;
a boundary sensing subsystem;
a container detection subsystem; and
a controller receiving outputs from and being responsive to the boundary sensing subsystem and the container detection subsystem, said controller comprising one or more processors programmed with logic instructions, which when executed by the one or more processors, cause the one or more processors to:
control the drive subsystem to follow a boundary once intercepted until a container at the second location is detected and turn until another container is detected, and
control the container lift mechanism to place a transported container proximate the second detected container.

36. The robot of claim 35 in which the controller is further configured to control the drive subsystem to return the robot to the first location.

37. An adaptable object handling system comprising:
a boundary subsystem; and
one or more of robots each including:
a chassis,
a lift mechanism moveable with respect to the robot chassis for transporting at least one object,
a drive subsystem for maneuvering the chassis,
a boundary sensing subsystem,
an object detection subsystem, and
a controller receiving outputs from and being responsive to the boundary sensing subsystem and the object detection subsystem, said controller comprising one or more processors programmed with logic instructions, which when executed by the one or more processors, cause the one or more processors to:
control the drive subsystem to follow a boundary once intercepted until an object is detected and turn until another object is detected, and
control the lift mechanism to place a transported object proximate the second detected object.

38. An automated method of depositing containers in given locations using a robot having a chassis, a container lift mechanism moveable relative to the chassis for transporting at least one container, a drive subsystem for maneuvering the chassis, a boundary sensing subsystem, a container detection subsystem, and a controller, the method, implemented in one or more processors of the controller, comprising the steps of:
controlling the drive subsystem to follow a boundary once intercepted until a container is detected and turn until another container is detected; and
controlling the container lift mechanism to place a transported container proximate the second detected container.

39. The method of claim 38 further comprising controlling the drive subsystem to return the robot to a given container source location.

40. The method of claim 39 further comprising controlling the container lift mechanism to retrieve another container at the container source location.

41. The method of claim 38 in which the container detection subsystem includes a camera based subsystem.

42. The method of claim 41 wherein the camera based subsystem includes a laser source which emits a beam intersecting a field of view of a camera between $x_{min}$ and $x_{max}$.

43. The method of claim 38 further comprising detecting a container or boundary condition and operating the drive subsystem and the container lift mechanism in response to the condition.

44. The method of claim 43 wherein the condition is that no containers are detected before three boundaries are detected.

45. The method of claim 44 further comprising locating a third boundary or obstruction and placing a transported container proximate the third boundary or obstruction to place a first container in a first row.

46. The method of claim 43 wherein the condition is that no container is detected before two boundaries are detected.

47. The method of claim 46 further comprising following a second boundary, detecting a container, and placing a transported container proximate the detected container to fill a first row with containers.

48. The method of claim 43 wherein the condition is that a first boundary is followed, a container is detected, and after the robot turns, no additional containers are detected before a second boundary or obstacle is detected.

49. The method of claim 48 further comprising placing a transported container proximate the second boundary or obstruction to fill a row with its first container.

\* \* \* \* \*